United States Patent
Galinski et al.

(10) Patent No.: US 10,484,339 B2
(45) Date of Patent: Nov. 19, 2019

(54) PERVASIVE DATA SECURITY

(71) Applicant: GLOBAL DATA SENTINEL, INC., New York, NY (US)

(72) Inventors: John-Philip Galinski, Forest Hills, NY (US); Nigel Walker, Ponteland (GB)

(73) Assignee: Global Data Sentinel, Inc., New York, NY (US)

(*) Notice: Subject to any disclaimer, the term of this patent is extended or adjusted under 35 U.S.C. 154(b) by 172 days.

(21) Appl. No.: 15/079,410

(22) Filed: Mar. 24, 2016

(65) Prior Publication Data

US 2017/0019379 A1 Jan. 19, 2017

Related U.S. Application Data

(60) Provisional application No. 62/137,734, filed on Mar. 24, 2015, provisional application No. 62/267,671, filed on Dec. 15, 2015.

(51) Int. Cl.
*G06F 21/00* (2013.01)
*H04L 29/06* (2006.01)

(52) U.S. Cl.
CPC .......... *H04L 63/0428* (2013.01); *G06F 21/00* (2013.01); *H04L 63/0442* (2013.01); *H04L 63/0861* (2013.01); *H04L 63/10* (2013.01); *H04L 63/166* (2013.01); *H04L 69/22* (2013.01)

(58) Field of Classification Search
CPC . H04L 63/0428; H04L 63/0861; H04L 63/10; H04L 63/166; H04L 69/22; G06F 21/00
USPC .......................................................... 726/4
See application file for complete search history.

(56) References Cited

U.S. PATENT DOCUMENTS

| | | | |
|---|---|---|---|
| 6,317,834 B1* | 11/2001 | Gennaro | G06F 21/32 380/286 |
| 6,738,821 B1 | 5/2004 | Wilson et al. | |
| 9,462,085 B2 | 10/2016 | Bullotta et al. | |
| 9,473,506 B1* | 10/2016 | Hensley | H04L 63/0428 |
| 9,723,091 B1 | 8/2017 | Krock et al. | |
| 2003/0037237 A1* | 2/2003 | Abgrall | G06F 21/53 713/166 |
| 2004/0126093 A1* | 7/2004 | Platt | H04L 63/045 386/230 |
| 2004/0148500 A1* | 7/2004 | Olkin | H04L 51/30 713/150 |
| 2005/0034049 A1 | 2/2005 | Nemawarkar et al. | |

(Continued)

OTHER PUBLICATIONS

Office Action dated Nov. 3, 2017 issued in U.S. Appl. No. 15/079,438, 23 pages.

(Continued)

*Primary Examiner* — Harunur Rashid
*Assistant Examiner* — Sakinah White Taylor
(74) *Attorney, Agent, or Firm* — Han Santos, PLLC

(57) ABSTRACT

A method and system of securing data. A security client program stored in a memory of a user device intercepts an operating system call performed by a calling application of the user device for an unencrypted asset. A first key for the unencrypted asset from a server is requested. Upon receiving the first key for the unencrypted asset from a server, a secure resource is created by encrypting the unencrypted asset. Then, the operating system call is completed and an update message is sent to the server.

20 Claims, 16 Drawing Sheets

(56) References Cited

U.S. PATENT DOCUMENTS

| | | |
|---|---|---|
| 2005/0044398 A1 | 2/2005 | Ballinger et al. |
| 2005/0050322 A1* | 3/2005 | Mizrah ................ H04L 9/0822 |
| | | 713/168 |
| 2005/0091310 A1* | 4/2005 | Salomon ............... G06F 9/5077 |
| | | 709/203 |
| 2007/0022164 A1 | 1/2007 | Nog et al. |
| 2007/0050838 A1 | 3/2007 | Liu et al. |
| 2007/0087829 A1 | 4/2007 | Liu et al. |
| 2007/0124310 A1 | 5/2007 | Mathur |
| 2012/0166582 A1 | 6/2012 | Binder |
| 2013/0174238 A1* | 7/2013 | Wang ............... H04N 21/25816 |
| | | 726/7 |
| 2013/0254537 A1* | 9/2013 | Bogorad ............... H04L 9/0822 |
| | | 713/165 |
| 2013/0318339 A1* | 11/2013 | Tola .................... H04L 63/0478 |
| | | 713/150 |
| 2013/0318347 A1* | 11/2013 | Moffat .................... H04L 63/08 |
| | | 713/168 |
| 2014/0032691 A1 | 1/2014 | Barton et al. |
| 2014/0059344 A1* | 2/2014 | Branton .................. G06F 21/10 |
| | | 713/165 |
| 2014/0164776 A1* | 6/2014 | Hook ........................ H04L 9/14 |
| | | 713/171 |
| 2014/0189808 A1* | 7/2014 | Mahaffey .............. H04L 63/083 |
| | | 726/4 |
| 2015/0052220 A1 | 2/2015 | Melvin |
| 2015/0100780 A1* | 4/2015 | Rubin ................. H04L 63/0823 |
| | | 713/157 |
| 2015/0222424 A1 | 8/2015 | Mosko et al. |
| 2015/0249647 A1 | 9/2015 | Mityagin et al. |
| 2016/0119289 A1 | 4/2016 | Jain et al. |
| 2016/0157129 A1 | 6/2016 | Guthmann et al. |

OTHER PUBLICATIONS

U.S. Appl. No. 15/079,438, Final Office Action dated Jun. 6, 2018, 31 pages.

U.S. Appl. No. 15/079,438. Office Action dated Feb. 25, 2019, 12 pages.

\* cited by examiner

PERVASIVE DATA SECURITY

CROSS REFERENCES TO RELATED APPLICATIONS

The present application claims the benefit of priority under 35 U.S.C. § 119 from U.S. Provisional Patent Application Ser. No. 62/267,671, entitled "Pervasive Data Security," filed on Dec. 15, 2015 and U.S. Provisional Patent Application Ser. No. 62/137,734, filed Mar. 24, 2015, which are hereby incorporated by reference in their entirety for all purposes.

BACKGROUND

In order to guard against advanced threats in a complex and evolving climate of virtualization, cloud services, and mobility, individual users as well as organizations increasingly take a data-centric approach to safeguarding their sensitive information. Software-based security solutions are frequently used to encrypt the data to protect it from theft. Encryption encodes messages or information in such a way that only authorized parties can have access to it. However, a malicious program or a hacker could corrupt the data in order to make it unrecoverable, making the system unusable or difficult to recover. Known systems that are used for security or audit have many limitations. For example, known systems may be vendor specific (e.g., providing security to only certain user packages) and are therefore limited in scope. Further, known systems typically operate as perimeter control, and thus, do not provide internal protection and visibility. Other systems may require a monolithic approach that is restricted to a single enterprise (e.g. an information technology (IT) infrastructure under the control and visibility of a single technical management). It is with respect to these considerations and others that the present disclosure has been written.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Overview

Figure 1:
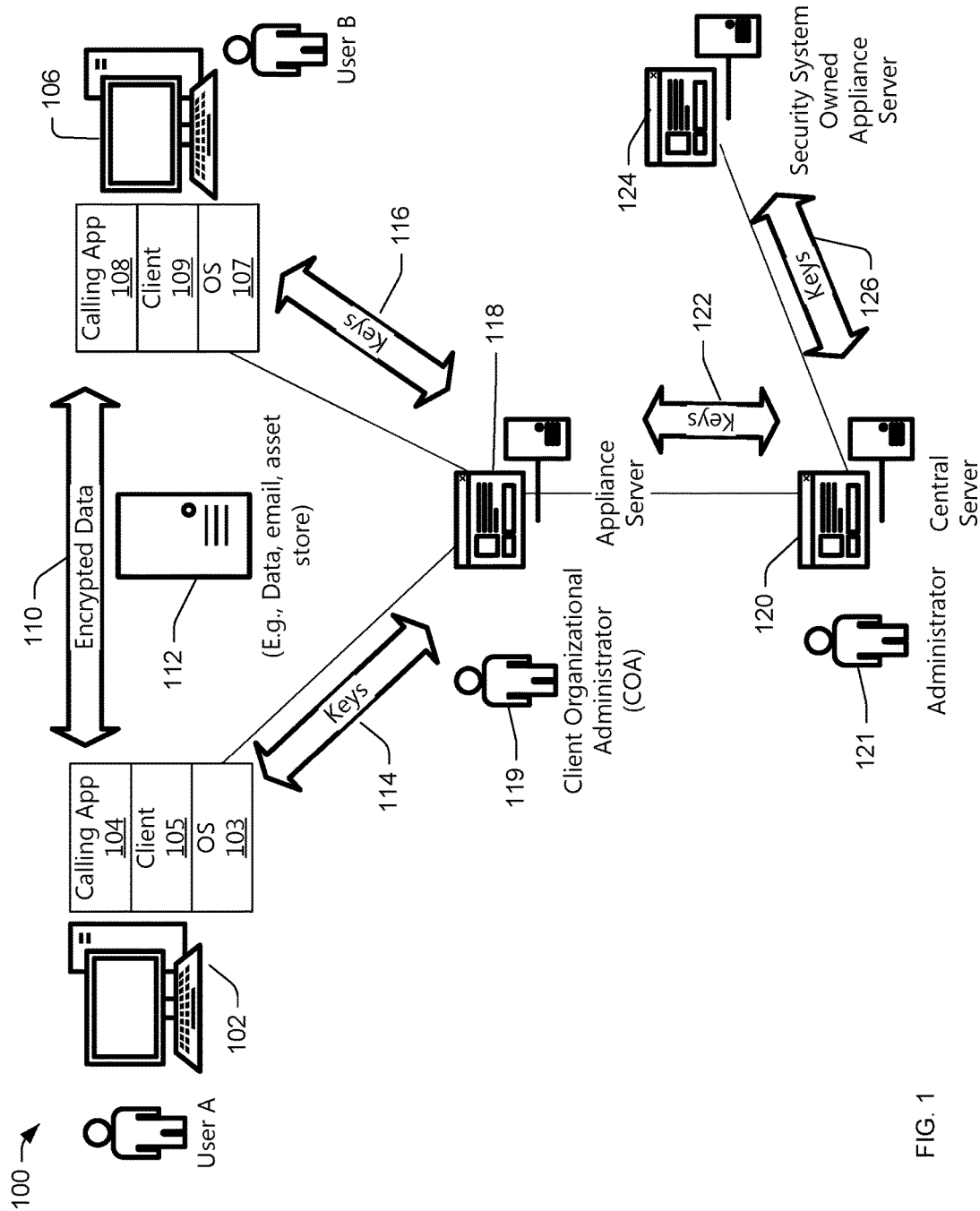
FIG. 1 illustrates an example architecture for implementing a security system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

This disclosure generally relates to data security, and more particularly, to systems and methods of pervasive security that provide fine grain control of data. In various embodiments, the teachings herein provide pervasive security, auditability, fine grain control, user-level data recovery, and client system self-management that may extend beyond an individual business enterprise into client partner organizations and accommodation of unaffiliated individual users.

In one aspect, substantially independent of the application or system used, data may be encrypted in transit and at rest. The data access is tightly controlled and audited on a per-user/per-resource compound basis, whether the resource is an email, file or other entity. The data may be under nearly constant and configurable backup control. In one embodiment, the user can rollback to prior versions directly.

This rollback utility may be used not only for general disaster recovery and/or business continuity (DR/BC), but also may be used during an active, malicious attack, (e.g., ransomware or other malware). The rollback utility provides rapid rollback to a system state before the contamination/attack as well as provide a diagnostic foundation for detecting the vector of the attack.

In one embodiment, data access is encryption controlled on a per-user basis. Accordingly, there is fine grain control and audit visibility that may extend down to the resource (e.g., file) level. These levels of security are specific to individual enterprises and may extend to other organizations. Data (e.g., files, content, email, etc.) can be securely shared and audited on a granularity down to User and access parameter basis.

In one aspect, the teachings herein are not limited to any particular technology base; rather, they may apply to a broader technology fabric such as workstations, laptops, pads, mobile devices, embedded technologies and even "dumb devices" (sometimes referred to as the Internet of Things (IoT)). The teachings herein include such devices in the scope of protection, as well as physical (e.g., sneakernet) processes that can be used as storage and transport for data and security elements.

In one aspect, the security architecture discussed herein is pervasive in that encryption, traceability, and control of data is distributed throughout an enterprise and covers security in devices and transports from origin, consumption, modification, and deletion. Replication and relocation and any other data operations may also be included. Accordingly, data is secure at multiple levels.

In one embodiment, password proof is based on zero-knowledge security in that a security server (such as an appliance server or central server discussed below) can validate the user of an application (app) running on a user device to determine whether they have a certain knowledge, without determining what the knowledge is, thereby preventing sensitive information to be transmitted and possibly intercepted. This may involve an extended and enhanced use of asymmetric key cryptography, although this embodiment may be extended to other cryptography base schemes.

In various embodiments, there may be audit and fine grain (e.g., object level) recovery services to intra-organizational (e.g., single shared IT infrastructure), inter-organizational (e.g., multiple independent IT infrastructure instances) and extra-organizational (e.g., users who are outside of any managed IT infrastructure) entities.

In various embodiments, the computer routine can be implemented in distributed code, agents and/or custom hardware. The security approaches discussed herein can co-exists with and can utilize legacy systems and architectures. Management and use of the implementation may be controlled by the security client to accommodate their particular requirements and policies.

In one embodiment, disaster recovery and business continuity features may be provided. The fine grain control (e.g., down to object level and/or user level) provides the ability to perform disaster recovery. A strong business continuity discipline may provide quick user-driven file recovery.

Behavioral Analytics

In one embodiment, behavioral analytics are provided. By virtue of the fine grain approach in securing data, a substantial amount of information may be generated regarding the access and use of data by system users. Such activity information may be used to construct algorithms that can learn from the harvested information and make predictions. Accordingly, machine learning can be used to identify patterns and trends.

In one embodiment, the security system described herein may include artificial intelligence (AI). Further, the system may be scalable, adaptable, and responsive in that the number of system users and encrypted data resources can expand and contract in response to demand. The extension into sharing resources inter or extra organizationally may be allowed by rule sets and scale the Appliance Servers and Central Servers to accommodate changes in the size and distribution of users and encrypted data items.

In various embodiments, the client performing the security features on a user device may be implemented in hardware or software. For example, the client device may be a hardware component (e.g., an application specific integrated circuit (ASIC)) that is physically attached to a user device (e.g., via a USB port). Alternatively, or in addition, the security features of the security client can be implemented in software that is stored in a memory of the user device.

In one embodiment, key pairs (e.g., private or public) may be generated on the user device client. The private keys may be stored in a memory or ASIC of the user client and the public keys may be stored on an appliance server. In addition, the public keys may be stored on a central server, as necessary, for backup and/or use external to the originating enterprise. These servers are discussed in more detail in a later section.

In one embodiment, the data channel and the key channel (e.g., control channel) are separate such that the transport paths are independent. Accordingly, with the exception of the security client of a user device, the channels are not stopped and synced together. Such channel independence may be extended to any additional security, audit, codec or other protocol layer.

There is a highly granular access control to secure resources as well as audit procedures. By virtue of such precise control of secure resources, a rich data store of the user interactions with the secure resources can be mined by an operational analytics and reporting layer. The analytics provide insights and trends into the overall operations from the perspective of not only users, but also the secure resources. Artificial intelligence may be used to identify baseline patterns or pattern sets from the analytics. In one embodiment, the baseline patterns are temporal and take into account cross interactions between one or more user devices and the secure data. The patterns and trends may be used by an analytics engine to identify deviations from the identified baselines (e.g., abnormal activity) that may be flagged for investigation.

Fail Safe Design

In one embodiment, the security system provides a fail-safe design. The system may be configured such that when an aspect of it fails, it fails in a closed way. For example, upon a component failure of any one of the user client, appliance server, central server, network/transport systems, and underlying infrastructure, access to the encrypted data or keys are prevented. Accordingly, the security system closes off secure information from access as a consequence of a failure.

Thus, an operation may be halted (e.g., suspended) until a connection to the appliance server is reestablished. In this regard, a message may be generated by the user client indicating that "connection to the appliance server is not available." Further, interaction with the secure resource may be prevented or severely limited.

In various embodiments, the response to a loss of a connection to the appliance server may be dealt with in different ways. In one embodiment, a secure resource (e.g., encrypted user data) with regular security requirements may include a locally stored (i.e., on the user device) key. In this regard, an operating system call involving the secure resource may continue or be restricted in various ways. For example, the secure resource may be saved but not deleted. However, in one embodiment for a secure resource that is deemed to be more security sensitive, the key may not be stored locally. Instead, the key is stored at the appliance server and may be accessed separately for each action on the data. In this regard, if a connection to the appliance server cannot be established, any operating system operation is halted or substantially limited to prevent a potential security breach.

In one embodiment, business continuity and disaster recovery are provided. For example, the security system may operate as a mesh network. In this regard, different recovery mechanisms can provide different levels of protection and/or restoration against different failure modes. For example, link, channel, segment, and path protection may be used. In one embodiment, there may be redundant servers (e.g., three or more servers to enact an n+1 redundancy scheme with continuous load balancing) on the domain (e.g., within a single IT infrastructure). Such redundancy maintains continuous availability of keys to authorized users and allow for single item failures or hot-swap maintenance.

In one embodiment, there is an automatic connection between a user device and an appliance server, which is transparent to the user. For example, the user client may find the appropriate security appliance server through a domain name server (DNS) type approach, whether internal to an organization or through the internet. The security system described herein may provide "public" servers that can be accessed via the internet. In this embodiment, a user device may search the DNS server to locate the appliance server(s) that are outside of the present client firewall (assuming that the user has not connected to their home network via a virtual private network (VPN)).

In one embodiment, a user device is connected to an appliance server and/or a central server (e.g., via appropriate appliance servers) to retrieve appropriate keys for cryptography that are related to a secure resource that may or may not reside on servers of a security services provider. The connection between a user device and an appliance/central server assures that the present access policies applied by the user device are up-to-date and common between the user device and the secure resource. This status still holds true for remote operations where a user device accesses information via a direct channel (e.g., on the LAN or infrastructure common to the related appliance servers), VPN (as a virtual path extending the direct channel, or other mode of communication to the direct channel.

However, in another scenario, it may be desirable to have a user device operating in an isolated (e.g., disconnected) mode. For example, a user device may be used on an airplane or the user device may be located in an area where there is no communication channel access. Put differently, there is a loss of a connection between a user device and an appliance server. In such a scenario, a user device and its associated data (e.g., any tools or data native to the user device, excluding the secure resource) can operate with a secure resource and a key set that have been previously authorized for this purpose. The differentiation here is that the secure data and associated keys have been authorized to have limited persistence on the user device. For example, a key that was previously provided by an appliance server (or central server) is stored in a memory of the user device. At least some of the operating system operations can continue to be performed securely, but the data and the key will not update until a connection is reestablished with an appliance (or central) server for synchronization. During such (e.g., disconnected) period, the access policies (e.g., read, write, delete, number of times allowable access, clock, and calendar access restrictions) may still be in-force until they are reconnected and any updates to the secure resource and keys have been performed. The key is maintained until there is a reconnect with an appliance (or central) server. Accordingly, in some embodiments, keys can travel with the user device. Offline operations would allow for travel (e.g., disconnected) usage. However, the individual keys can be configured on a per secure resource. A temporary transaction queue may be held on the user device until reconnected.

Scalability, Load Balancing and Redundancy

In one embodiment, the appliance and central servers discussed herein have a small footprint and can be readily replicated. For example, the overall used technical resources (e.g., processor, storage, memory) for the appliance and central servers comprise a small footprint based on the overall design of these services and base implementations currently operating. Each of these devices are expected to fit into the smallest current available servers. Further, these servers may be configured in a redundant hierarchy. The central server may cross-sync with local appliance servers to provide key transport as well as replication services. Such services may be provided by the central server to subscribed client devices, as well as external devices. In various embodiments, the central server and/or the appliance server can reside at one or more fixed facilities or in a cloud. The servers are elastic in that more machines can be added as needed on the cloud.

In various embodiments, there may be a heterogeneous distribution of keys (e.g., where keys in a server grouping/cluster are not identical), and a homogenous distribution of keys (e.g., where keys in a server grouping/cluster are identical in each server in the grouping/cluster) for load balancing. In one embodiment, a grouping is differentiated from a cluster since clustering may be specific to prescriptive defined synchronization of more than one server, while grouping is used as a loose definition of servers that are performing the same functions that may have different rules and data.

Portability

In one embodiment, the system described herein facilitates interaction with other user device calling applications, abstract computing machines (e.g., a virtual machine such as a Java virtual machine) and operating systems (e.g., WINDOWS (Registered trademark), APPLE OS X (Registered trademark), IOS (Registered Trademark), ANDROID (Registered trademark), Unix, etc.). An operating system call from a user device can be intercepted in several ways. For example, a web distributed authoring and versioning (WebDAV), which is an extension of the Hypertext Transfer Protocol (HTTP) that allows clients to perform remote Web content authoring operations, may be used for every operating system call by the calling app. API connection points are on generic applications, designed for OS connection, so that there is no need to have app specific links. The common nature of the OS interfaces make it more reliable. Thus, messages between the user device operating system (OS) and calling application are intercepted to perform the cryptographic functions discussed herein. Calls that extend outside of the user device and to the appliance and/or central servers (or other security server) are encrypted and digitally signed for security to provide a continuous and nearly impenetrable security fabric.

Installation of the security client and the relevant upgrades/patches are configured to be secure. When the security client is deployed, a signed application is used for the user client installation. For example, in WINDOWS (Registered trademark) systems, MICROSOFT (Registered trademark) (MS) Click-to-Run for deployment may be used. In one embodiment, upgrades and patches only from secure web sites are permitted.

Pervasive Security Fabric

In one embodiment, a secure resource (e.g., data or data file) has temporal depth. For example, multiple versions of the secure resource are automatically stored and indexed by the security client on a user device.

Each of the versions of the secure resource includes its own unique encryption key and associated metadata (sometimes referred to herein as "ResourceData"). Accordingly, access to one version does not automatically allow access to other versions in the chain, thereby providing a fine grain control over the evolution of a secure resource.

The secure resource is maintained separately from all of the keys that are authorized to open it. Each authorized User and secure resource key is unique to the User and that specific secure resource. For example, a secure resource with "n" authorized users may have "n" associated keys. A user with authorization to "m" secure resources may have "m" associated keys. In one embodiment, the maximum set of keys for any system are provided by equation 1 below:

$$\text{Keys} = \text{Total Authorized Users} \times \text{Total Secure Resources} \qquad \text{Eq. (1)}$$

While equation 1 provides an upper limit for an example embodiment, in practice, the total number of keys may be smaller. By virtue of the security infrastructure discussed herein, where the secure resources and data are separate, and endpoint cryptographics via the user client are used, a secure "fabric" is provided that is elastic, in that it expands or contracts to accommodate the different needs of a subscriber of the security system.

The security infrastructure, whether it is intra-organizational, inter-organizational, or extra-organizational, generally does not need a setup, be tuned, or even be "aware" that the security system is operating. For example, there are no additions or changes required to the currently existing infrastructure to accommodate the system discussed herein. That is because, in one embodiment, the user client (of a user device) and the security appliance server are configured to handle data security issues in a transparent way. For example, one or more appliance servers can be instantiated on client-provided compute infrastructure (e.g., either existing or new) or provided as an appliance type device the client can deploy in their own network.

In one embodiment, the functions of the user client are performed by a hypervisor layer on the user device. In one embodiment, security functions are performed by provisioning of a data center or infrastructure and run by a security services provider.

Granular Access Control, Audit, and Disaster Recovery

Since the secure resources and the corresponding keys are specific to the intersection of interaction (i.e., the point of a specific key, specific resource, and specific User at the time of interoperation), and all key activities are logged by the security appliance server, a detailed audit trail is created. In one embodiment, there is zero knowledge security. To that end, as part of the overall encryption and security, the specifics of content of the secure resource may not be known. Thus, the audit stream would not capture the content of the secure resource. Instead, what is recorded in the audit stream is that a user device (e.g., UserN) interacted with a secure resource (e.g., secure resource M) by creating, reading, updating, and/or deleting that secure resource. Neither the actual content of the secure resource nor the specifics of the changes to the secure content are tracked. Accordingly, such zero knowledge approach provides an additional level of security for the secure resource. In one embodiment, the automatic versioning function may allow the client to instruct the security system to create versions (e.g., according to user customizable policies) of the secure resource as well.

In one embodiment, the logging and versioning functions of the present security system provides hot (i.e., instantly available) access to time-logged versions of the secure resource such that individual users with sufficient permissions are able to select and restore various versions of a file. This ability allows for fast recovery of user devices on a per-User and/or per secure resource basis.

The techniques described herein may be implemented in a number of ways. Example implementations are provided below with reference to the following figures.

Example Architecture

FIG. 1 illustrates an example architecture for implementing a data security system. FIG. 1 illustrates an architecture 100 that may include one or more user devices (102, 106) that can be operated by their user (e.g., User A or B), respectively. User devices include, but are not limited to, standard PC workstations, laptops, pads, phones (mobile devices), embedded technologies and other intelligent network connected computing devices. Users A/B are authorized to use the security system 100 to interact with a secure resource resident on a secure resource 112 (e.g., data or data file). Each user (e.g., User A and B) or their corresponding user device 102 and 106, respectively, is known by the appliance server 118.

The security aspects of user devices 102 and 106 may have similar components. Accordingly, the security features will be discussed in the context of user device 102 and not repeated for user device 106, for brevity. An authorized user device includes an operating system (OS) 103 that manages the user device hardware and software resources and provides common services for computer programs, such as calling applications 104. An operating system may be any known operating system such as WINDOWS (Registered trademark), OS X (Registered trademark), ANDROID (Registered trademark), etc. A calling app 104 may be any program that makes an operating system call, such as word processing, a spreadsheet, browser, email client, music player, full custom client specific applications (e.g., actuarial system or patient management system), and the like.

The user device 102 includes a security client 105 that is configured to provide various security functions, such as receiving keys from the appliance server 118 or the central server 120, encrypting a secure resource 112, decrypting a secure resource 112, etc. In various embodiments, the security client 105 can be implemented in hardware or software.

Every operating system call performed on the user device 102 through calling app 104 is intercepted by the security client 105 for a security function. For example, an operating call may include, but is not limited to, creating, opening, changing, saving, and deleting data or a file. The security function, performed by the security client may be requesting a key 114 from an appliance server 118 in order to create, open, change, save, and/or delete a piece of data or a file. In one embodiment, the subject matter of an operating system call (e.g., the asset) is always encrypted as a secure resource 110. A secure resource 110 represents encrypted data that may be a single object that may be a text file, video, email, or other discrete data set or file. In one embodiment, a secure resource 110 is at the finest grain of a securable piece of data (e.g., the fine grain may extend down to a field level in a database).

A secure resource 110 is encrypted in transit and at rest. In one embodiment, the system 100 can operate without a connection to the central server 120, but the appliance server would provide user public keys. In one example, all the keys of an appliance server (e.g., 118) are replicated at the central server 120. Keys may pass through the central server 120 inter-organizational communication.

The appliance server 118 is configured to provide various functions, including the functions of being the direct distribution, storage, and management system for keys pertinent to the associated user groups (e.g., users A and B). Further, appliance server 118 may also interface with a security central server 120 for inter-organizational security purposes, discussed in more detail later. Thus, different appliance servers (e.g., 118 or 124) may be configured to accommodate various security functions of different user groups. In one embodiment, user groups are assigned by location. For example one or more appliance servers 118 may provide security support for New York, while one or more appliance servers 124 may provide security support for Los Angeles. In one embodiment, an appliance server 118 may be under the control of an organization where users A and B belong. It should be noted that the servers discussed herein (e.g., appliance servers 118, 124 and central server 120) may be implemented in hardware or software.

In one embodiment, the appliance server 118 may be operated by a client organizational security administrator (COA) 119. For example, the client organizational security administrator 119 may be an employee of the organization that owns the user device 102 or where User A works. The client organizational security administrator 119 may have administrative rights for user client software deployment, updates, patches, and the like.

A security central server 120 is configured to manage keys inter-organizationally (i.e., across organizations). The security central server 120 communicates with one or more security appliance servers (e.g., 118 and 124) to receive and provide information related to keys 122, 126.

In one embodiment, there may be a central server security administrator 121 who may be an employee of a security services provider. The central server security administrator 121 may have authority to grant client organizational administrator (COA) 119 devices 118 administrative control to allow the COA 119 to manage the security features of the security client 105.

Accordingly, administration of the security system 100 discussed herein may be hierarchical in that the central server security administrator 121 (who may be an employee/agent of the security service provider) may authorize the client organizational administrator 119 to manage the User administration of the organization that owns user device 102 or where User A works. For example, the client organizational administrator 119 may then create, authorize, administer and associate (e.g. employee to manager rights control) individual system users. In one embodiment, the rules for the associations in an organization (defined as a group of systems and users under the direct control of an authorized organization) are created and managed by the client organizational administrator (COA). The rules for access to the individual secure resources may be under the control of the secure resource creator/owner(s). Control of number and type of automatic versions of the secure resources may also be under COA control.

In one embodiment, the activities of the users, managers, and administrators, are tracked on their own (e.g., actions that do not directly interact with secure resources) and in relation to the activities performed on the secure resources. Such tracking provides fine grain control and visibility for audit and trace work.

When an operating system 103 call is performed by a user device 102 by using a calling app 104, the security client 105 intercepts the call for encryption. This operation is typically transparent to the user (e.g., User A) of the user device 102. The data is encrypted/decrypted using the key that is obtained from the appliance server 118 upon request from the security client 105. In the example of FIG. 1, these keys are maintained in the security appliance server 118 and a replica of the key is maintained in the central server in the case that the resource and key are used outside of the scope of appliance server 118.

For example, a User associated with appliance server 124 has access to resources created by user device 102. This encrypted data is referred to herein as a secure resource. The secure resource can be transported or stored internally or externally of an organization that subscribes to the security service. The keys do not travel with the secure resource when they are sent, for example, to another user device 106. Thus, the secure resource cannot be decrypted on its own upon receipt. In this regard, retrieval of the requisite keys is managed by the security client (e.g., 105 or 109) that resides on the user device (e.g., 102 or 106). The keys are specific to individual users, respectively, so that for any given secure resource, there will be at least one key. Additional keys may be provided for each authorized user. The secure resource 110 makes no indication about the keys that can access it, since the key data is not stored as part of the secure resource. In one embodiment, the keys only have awareness (e.g., reference to) the secure resource by location, which may be provided by a globally unique identifier (GUID) or the like. In the example of the GUID, it is the OS specific reference that uniquely identifies a file. This is part of the file access scheme. The unique identifier can be used by the security client to synchronize the key reference to the secure resource to retrieve and decrypt the secure resource. Accordingly, since access to and visibility of any secure resource is predicated by key access, the resource can be protected, exposed, or effectively deleted by changing the keys or deleting the keys.

Monitoring and Reporting:

As discussed above, access to the secure resources are tracked at a fine grain. In one embodiment, such fine grain security approach facilitates monitoring functions. For example, access to the secure resources 112 are traced to the key 114, 116 activities since activity involving an OS 103 call is predicated on key access specific to a single secure resource 110 and a single user (e.g., User A) for any action (e.g., including simply viewing a secure resource 110). Since monitoring is part of the security fabric of system 100, reporting is a matter of analytics to summarize activity. Monitoring can also be used for predictive functions to prevent operational and security issues.

Fine grain key control can be described as control of individual secure resources and the versions thereof. Each secure resource 110 can have a history of versions, which may be referenced by the secure resource keys (e.g., 114, 116). Such fine grain control facilitates quick roll back to prior versions of a secure resource by the system users, without administrative intervention. Accordingly, unlike prior art security systems that require administrator intervention and a time consuming process of recreating a prior user device state, based on the teachings herein, a user device (e.g., 102) or the secure data used thereby, can be rolled back to a precise prior state.

Physical Topology

Figure 2:
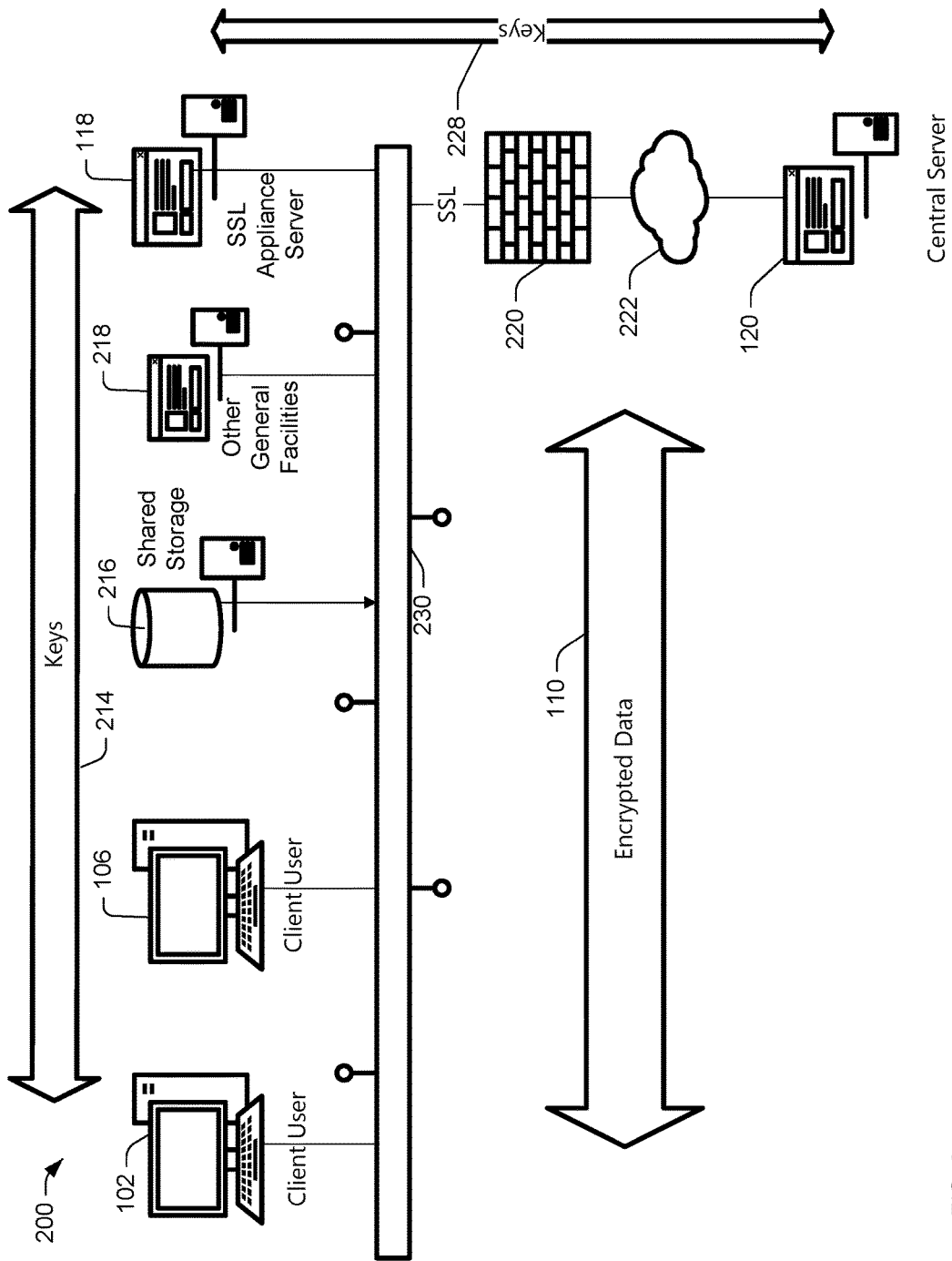
FIG. 2 illustrates a physical topology of various elements of an intra-organizational security system, consistent with an exemplary embodiment.

Reference now is made to FIG. 2, which illustrates a physical topology of various elements of an intra-organizational security system, consistent with an exemplary embodiment. Intra-organization security system 200 may include one or more user devices 102, 106 that may use a shared storage 216 via a local area network 230, which may be a virtual private network (VPN). The local area network 230 may be used by other general facilities 218. Security system 200 may also include an appliance server 118 that communicates over the local area network 230 to the central server 120. In various embodiments, the communication may be via a secure sockets layer (SSL) or transport layer security (TLS).

Every interaction with the shared storage 216 may involve the retrieval and application of one or more keys 214. These keys 214 may be provided by the appliance server 118 via the local area network 230. The secure resource 110 can thereby be read, altered, transferred, deleted, stored, etc.

In various embodiments, the keys 228 are provided to the central server 120 (e.g., for inter-organizational sharing of keys) at predetermined time periods or upon a triggering event. A triggering event may be initiated by the appliance server 118 or the central server 120 to synchronize the keys 228.

In one embodiment, the communication between the appliance server 118 and the central server 120 is via a firewall 220 and a cloud 222 using SSL.

In one embodiment, the central server 120 communicates with the appliance server 118 exclusively. To that end VPN 230 may be used as an interface. Encrypted data is decrypted at the client user device (e.g., 102) if the user device (e.g., 102) has been granted a key for that particular encrypted secure resource 110.

Cluster and Load Balance

Figure 3:
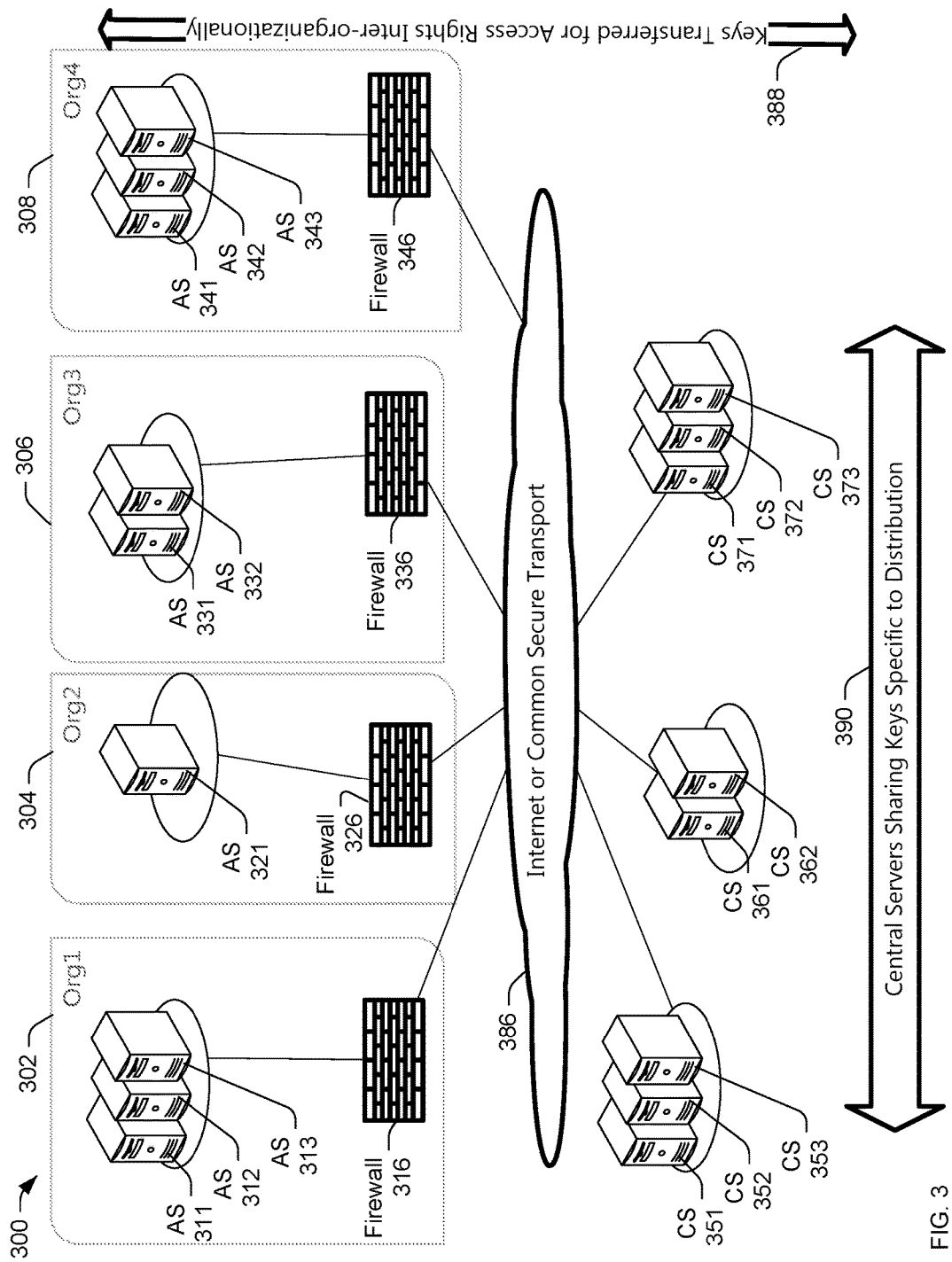
FIG. 3 illustrates cluster and load balancing in a multi organizational environment.

Reference now is made to FIG. 3, which illustrates an example of cluster and load balancing in a multi organizational environment. System 300 includes multiple organizations (e.g., 302, 304, 306, and 308) that are coupled to a network 386, which may be the Internet or a common secure data transport.

By way of example, organization 302 is illustrated to include several appliance servers (AS) 311, 312, and 313. The communication between the organization 302 and the network 386 is protected by a firewall 316. Regarding organizations 304 to 308, they include features that are similar and are therefore not repeated for brevity.

System 300 illustrates multiple organizations 302, 304, 306, and 308, where each organization may have different installations and use of clustering of appliance servers tailored for the purposes of each organization. For example, organization 302 may have three appliance servers 311, 312, and 313, whereas organization 306 may have two appliance servers 331 and 332. Within each of the organization clusters, the key data stored may be homogeneous (i.e., identically replicated amongst the servers of the cluster). Accordingly, various load balancing schemes can be used to distribute the computational load between the servers.

It should be noted that in a heterogeneous configuration, the key stored in each server is different, whereas in a homogeneous configuration, all the key stores are identical at any quiescent point (after propagation of any user driven changes to keys).

In one embodiment, only keys that are used inter-organizationally are replicated to the central servers (e.g., 351, 352, 353, 361, 371, 372, and 373). These externally shared keys would be restricted by need as well as adaptive policies.

There can be layers of policies that are administered by the security provider and/or the COA at the client location. These policies may include implementation of rules for geographic data restrictions that might be part of a compliance (e.g., HIPAA, FINRA, SEC, SarbOx, etc.). In such a scenario, keys would not be allowed to propagate to central servers located outside of the restricted areas. Conversely, an organization may choose to proliferate the keys to a wider range of central servers to allow for greater response and provide a data recovery (DR) route.

If a user in one organization (e.g., 302) and a user in another organization (e.g., 304) share a secure resource, the key would propagate to the central server cluster(s) that are most closely associated with the corresponding organization. For example, central server clusters 351 to 353 (e.g., Org 1) may correspond to appliance server cluster 311 to 313; default connection for a user from any of the other orgs (e.g., Org 2, 3, 4) would be that same central cluster. In general, a case where the Org 2-4 would go to other central clusters would be based on rules that allow propagation of the specific keys to the other clusters and, all things being equal, a DNS type service may select the other clusters as being a preferred choice for key access.

Within a central server cluster (e.g., 371 to 373) keys are replicated homogeneously. In one embodiment, such homogeneous replication facilitates cluster load distribution and failover functions. Inter-organizational keys 388 are replicated across central server clusters (e.g. central server cluster 351 to 353 and central server cluster 371 to 373) as appropriate to provide access and performance to the users. Based on these policies, keys would be replicated and updated accordingly. Thus, the central server clusters may have identical keys, but will have overlapping subsets of keys from Org 1-4.

Example Call Flow Processes

Figure 4:
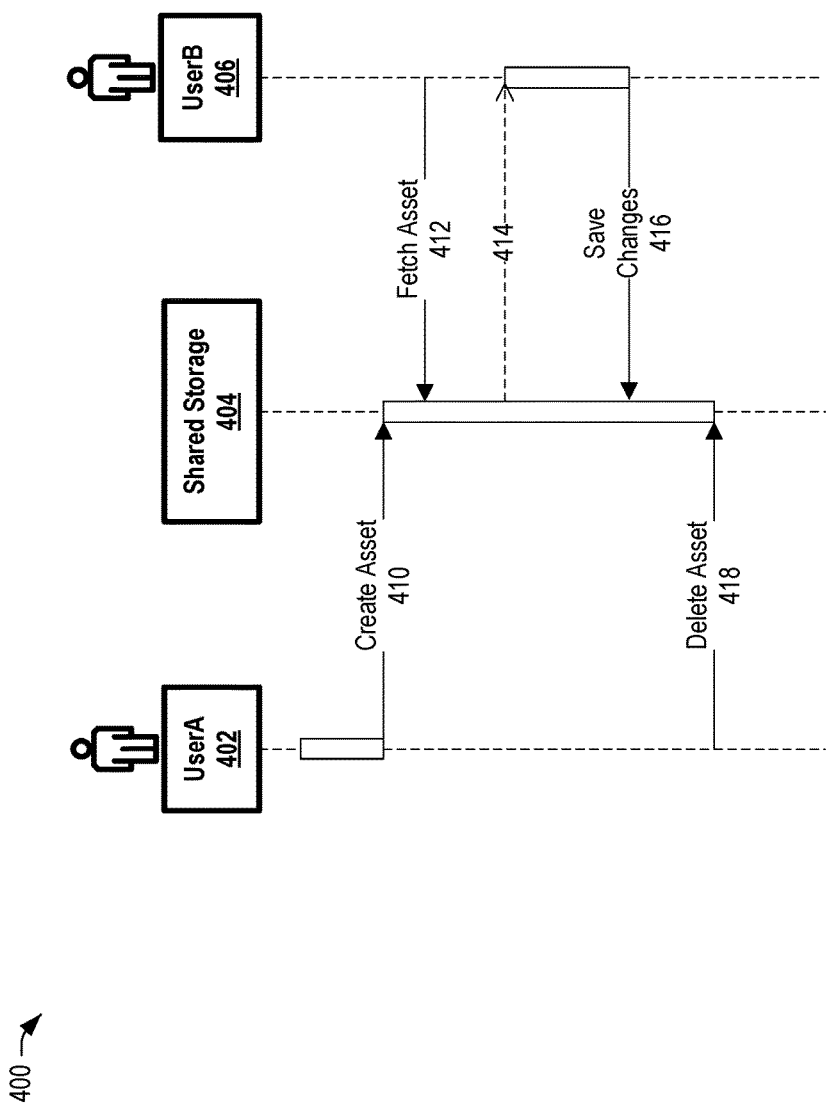
FIG. 4 illustrates a high level example call flow between two authorized users using the system of FIG. 1.
Figure 5:
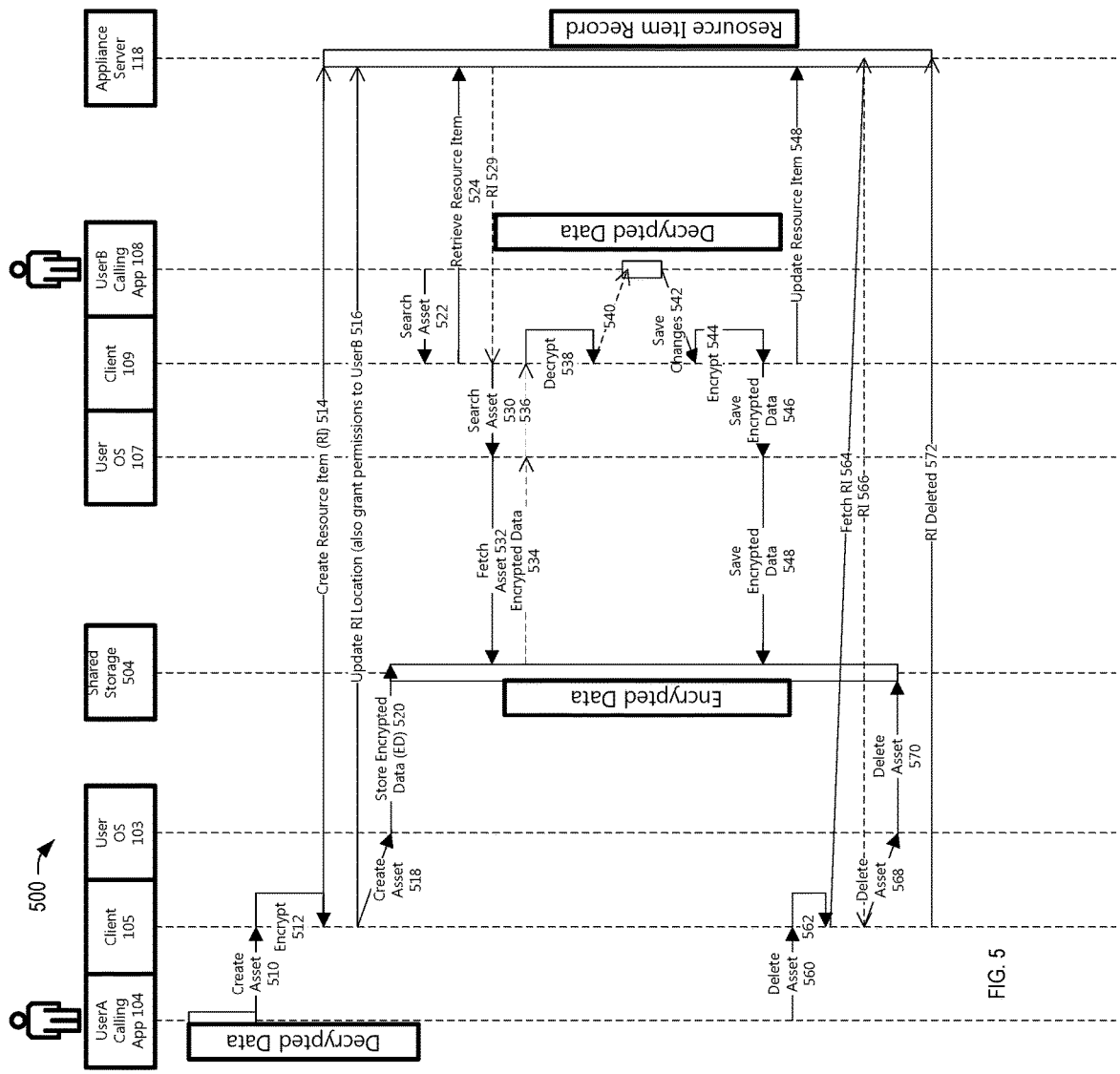
FIG. 5 illustrates a high level example call flow for secure intra-organizational transactions as relates to the creation, use and destruction of secure data.
Figure 6:
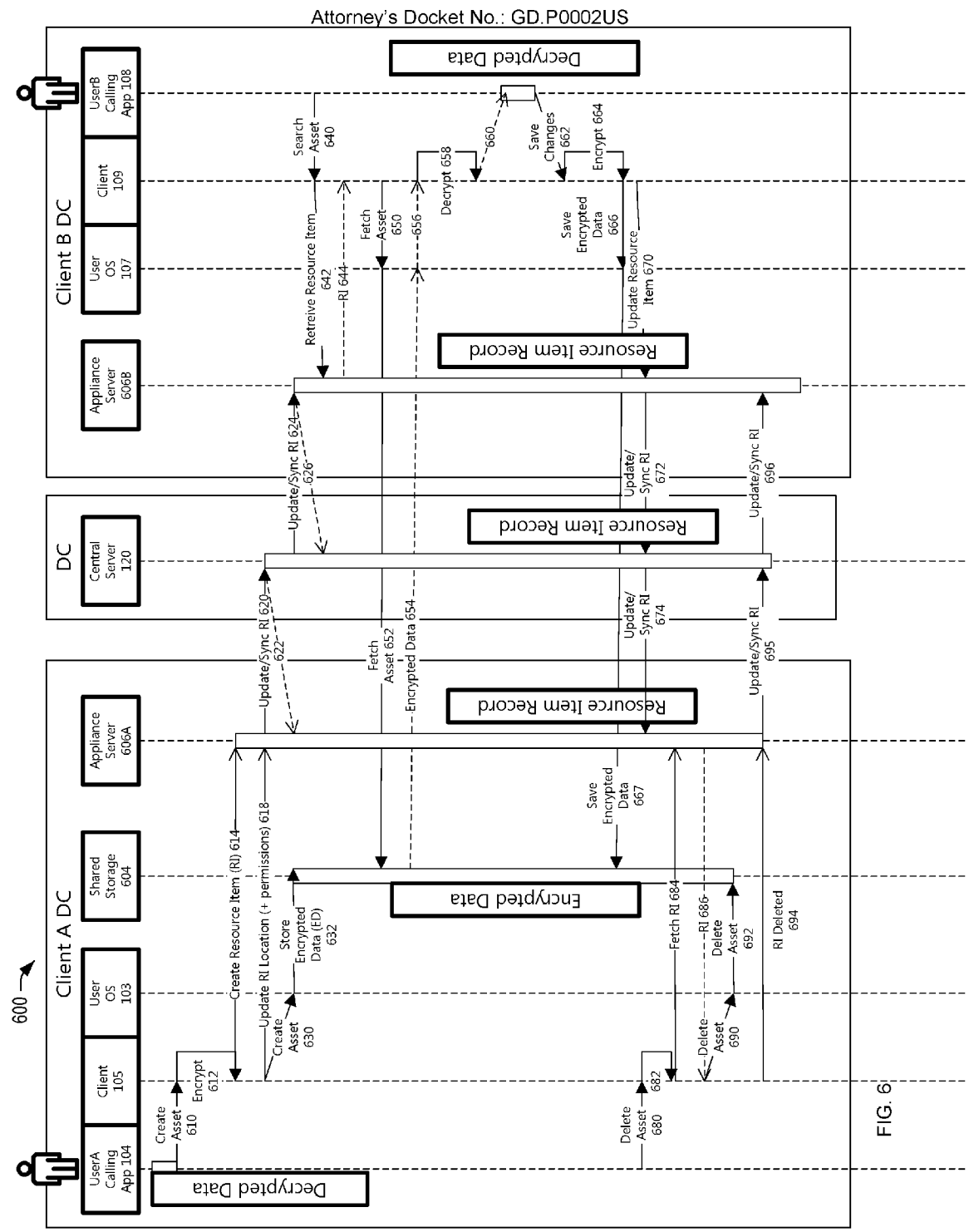
FIG. 6 illustrates a high level example call flow for secure inter-organizational transactions as relates to the creation, use and destruction of secure data.
Figure 7:
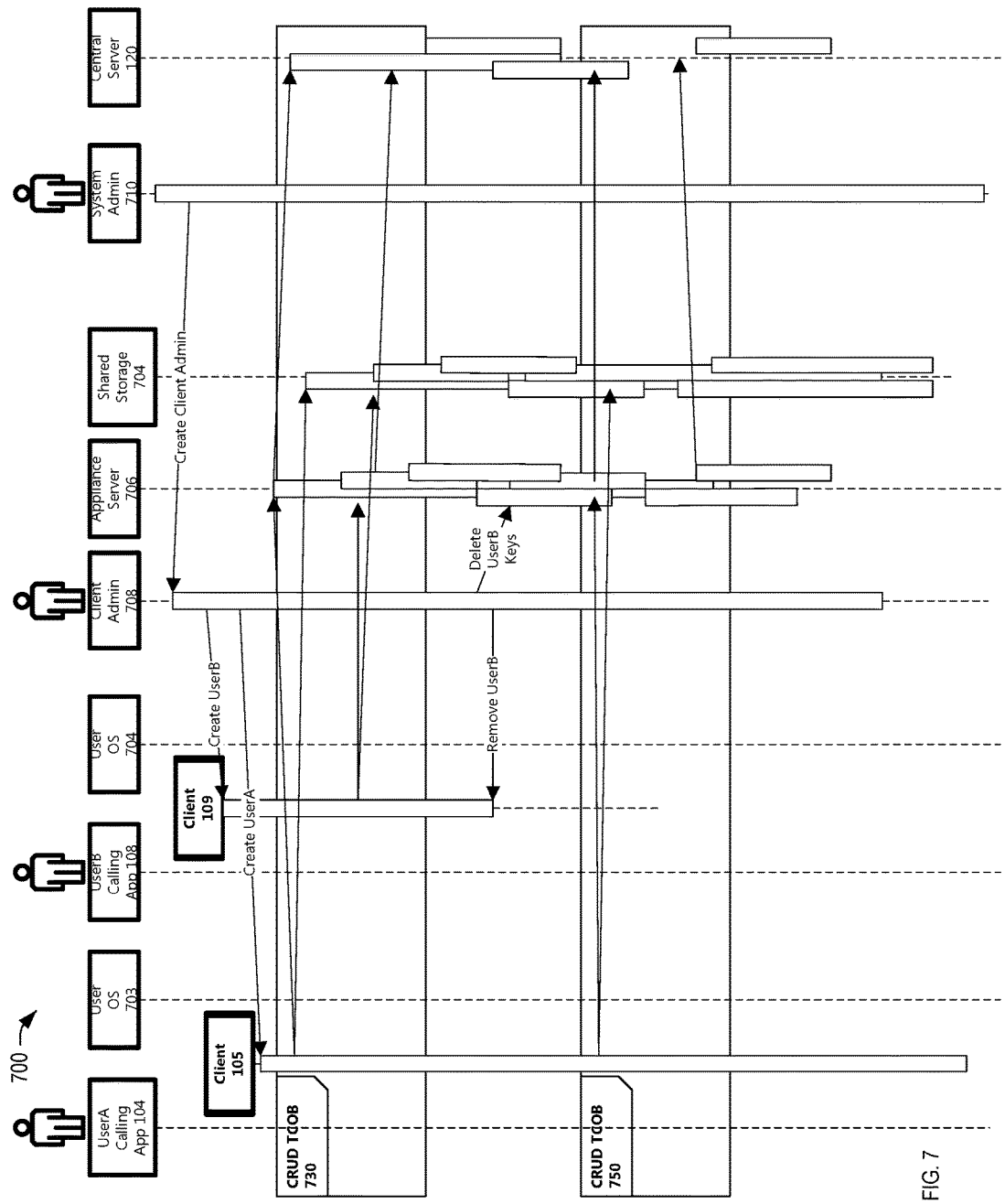
FIG. 7 illustrates a high level example call flow for intra-organizational administration of data security and User administration features.

With the foregoing overview of the security systems 100, 200, and 300, it may be helpful now to consider a high-level discussion of example call flow processes. To that end, FIGS. 4, 5, 6, and 7 illustrate high level example call flow processes for providing pervasive data security. In particular, FIG. 4 illustrates a high level example call flow between two authorized users using the system of FIG. 1. FIG. 5 illustrates a high level example call flow for secure intra-organizational transactions. FIG. 6 illustrates a high level example call flow for secure inter-organizational transactions. FIG. 7 illustrates a high level example call flow for intra-organizational administration of administrators, users, and data security features. The call flow processes 400, 500, 600, and 700 are illustrated as a collection of steps in logical flows, which each represents a sequence of operations that can be implemented in hardware, software, or a combination thereof.

In the context of software, the steps represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described steps can be combined in any order and/or performed in parallel to implement the process.

For discussion purposes, the processes 400, 500, 600 and 700 are described with reference to system 100 of FIG. 1.

Example Intra-Organizational Call Flow Process

FIG. 4 illustrates a high level example call flow between two authorized users using the system of FIG. 1 during a lifecycle of a secure resource that may be stored in a shared storage 404. It is noted that this lifecycle accommodates current systems that do not subscribe to the security system discussed herein. For Users A and B, the security system may be largely transparent. The shared storage 404 is shared between User A 402 and User B 406. Users A and B represent authorized users of an organization that are each using the security system via their user devices. Thus, while User A and User B are illustrated, it can be interpreted that the actions are performed by a corresponding user device. Accordingly, the term "user" and "user device" are used interchangeably in the discussion below.

At step 410, an asset (prior to becoming a secure resource via encryption) is created (i.e., by User A) and sent to the shared storage 404 for storage. The operating system call for storage is intercepted, by a security client stored on the user device 402 to retrieve a key from an appliance server to provide a key for the operation of encryption of the asset to create a unique secure resource. The retrieval of the key is transparent to the user device 402.

At step 412, User B via their user device 406 requests to retrieve the secure resource from the shared storage 404. In this regard, the request is intercepted by the security client of the user device 406 to retrieve a key from the appliance server. Again, the retrieval of the key is transparent to the user device 406.

At step 414, the user device 406 receives the secure resource. The secure resource may be altered by the user via the user device 406.

At step 416, the user device 406 sends the now revised secure resource to the shared storage 404 for storage. The request is intercepted by a security client on the user device 406 to retrieve a key for the operation.

At step 418, the user device 402 may send a request to delete the secure resource from the shared storage 404. In this regard, the security client of the user device 402 intercepts the request to receive a key for the operation.

As described above, while the users of the organization are performing regular operations, the security fabric is largely transparent to the users.

Example Intra-Organizational Call Flow Process

FIG. 5 illustrates a high level example call flow for secure intra-organizational transactions. Flow 500 includes User A having a user device that includes a calling application 104, a security client 105, and an operating system 103. There is a second User B having a user device that includes a calling application 108, a security client 109, and an operating system 107. There is a shared storage 504 that can be used by both User A and User B. This shared storage does not need to be specific to a security system provider, but is visible to the user operating systems. There is an appliance server 118 and a central server 120.

At step 510, the calling application 104 creates an asset. The asset may be a spreadsheet document, word document, mp3 file, etc. This asset is not yet encrypted.

At step 512, the security client 105 intercepts any operating system call that may be performed to begin the encryption process. An operating system call may include, without limitation, an attempt to store, send, or alter an asset. The interception may be performed with an intervening hook, such as WebDav, as described before. In order to encrypt the asset, a unique key is generated that is specific to the asset and all of its versions. To that end, at step 514, the security client 105 communicates with an appliance server 118 to receive a resource item (RI), sometimes referred to herein as a key, which is specific to that secure resource and user combination. A resource item may be a key that is used to decrypt the secure resource. The resource item is described in more detail in a later section. It should be noted that although a single key is described here by way of example for reasons of simplicity, multiple keys may alternatively be used within the scope of the present disclosure. Multiple keys are described in greater detail in the context of the discussion of FIG. 8 below.

Upon receiving the key from the appliance server 118, the security client 105 completes the encryption step 512.

At step 516, the security client 105 interacts with the appliance server 118 to update the resource item (e.g., key) with the (i.e., stored at rest) location of the now encrypted secure resource. For example, the originator of the secure resource, the user device that it is on, the time it was created, etc. may be provided. The security client 105 may also provide specific permissions to other users, such as User B, to have access to the secure resource. This permission to User B will later allow User B to have access to the secure resource.

Next, at step 518, the security client 105 attempts to store the now encrypted data (ED) in a shared storage 504, which is known to the user OS 103. To that end, the security client 105 performs an operating system 103 call. The ED, sometimes referred to herein as the secure resource, is then stored (i.e., step 520) in the shared storage 504, thereby completing the creation phase of a secure resource. The filename that is used for storing the secure resource is a mapped value of the filename that is known to the user, thereby obscuring the identity of the secure resource from any random access. This mapped value is used by the Appliance Server to provide the real filenames to the GDS client upon request to facilitate the mapping. This, in addition to the encryption of the contents of the secure resource, provide protection of the asset even when using common available storage. User B will use another key to access this asset, previously generated by User A, but specific to the combination of User B and the secure resource. It should be noted that the operating system 103 may be unaware that this is an encrypted asset and uses its normal facilities to perform the storage of the asset.

At some point, User B may want to perform an operation on this secure resource. A typical operation may be to read, write, edit, or delete the secure resource. In this regard, at step 522, the calling application 108 of user device B may attempt to retrieve the secure resource. This call is intercepted by the security client 109 at step 522 for security reasons. Since the location and the name of the file is encrypted, the client 105 learns the location to access the desired content.

To that end, at step 524, the security client 109 interacts with the appliance server 118 to retrieve a key therefrom.

At step 529 the appliance server 118 provides the resource item in the form of a digital key to the security client 109. This digital key was previously generated by the owner/administrator of the asset (e.g., User A) such that User B can have access to the secure resource. This digital key is unique to the combination of User B and the asset.

Returning back to step 529, upon receiving the resource item (e.g., key) from the appliance server 118, at step 530 the security client 109 of the user device searches for the secure resource by performing an operating system 107 call. The operating system 107, at step 532 communicates with the shared storage 504 to retrieve the encrypted data therefrom.

At step 534, the encrypted data is provided to the operating system 107. At step 536 the security client 109 intercepts the operating system call to decrypt the secure resource at step 538.

At step 540, the decrypted asset can be used by the calling application 108 to perform various operations, such as making changes to the decrypted asset.

At step 542 the calling application 108 attempts to save the changes made to the decrypted asset.

At step 544, the security client 109 intercepts the operation and immediately encrypts the decrypted asset for protection.

At step 546, the operating system receives the request to save the secure resource from the security client 109.

At step 548, the now modified and encrypted secure resource is saved at the shared storage 504.

Returning to step 544, in one embodiment, upon encrypting the decrypted asset, at step 548, a message is sent to the appliance server 118 to update the resource item (e.g., key).

At step 560, the User A may decide to delete the asset (e.g., secure resource). To that end, the calling app 104 may issue a delete command.

At step 562, the delete operation is intercepted by the security client 105.

At step 564, the security client 105 requests a resource item (e.g., key) from the appliance server.

At step 566, the appliance server 118 provides the resource item to the security client 105.

Next, at step 568, the security client 105 attempts to delete the secure resource from the shared storage 504. To that end, the security client 105 performs an operating system 103 call. In turn, the operating system 103 sends a delete command 570 to the shared storage to delete the secure resource from the shared storage 504.

At step 572, a confirmation is sent to the appliance server 118 to inform that the secure resource is no longer available.

Example Inter-Organizational Call Flow Process

FIG. 6 illustrates a high level example call flow process for secure inter-organizational transactions. Flow 600 includes an organization A represented by client A data center domain (DC) and an organization B represented by client B DC. There is a central server 120 that is configured to serve both organizations A and B. The central server is hosted by the security provider.

The organization of client A has a user device that includes a calling application 104, a security client 105, and a user operating system 103. Organization A further includes an appliance server 606A and a shared storage 604.

The organization of client B includes a user device having calling application 108, a security client 109, and a user operating system 107. Organization B further includes an appliance server 606B.

At step 610, the calling application 104 creates an asset. The asset may be a spreadsheet document, word document, mp3 file, etc. This asset is not yet encrypted.

At step 612, the security client 105 intercepts any operating system call that may be performed, to begin the encryption process. In order to encrypt the asset, the security client 105 uses a unique key generated that is specific to that asset and user combination. In one embodiment, the unique key provides access to all of the versions of the asset. To that end, at step 614, the security client 105 communicates with the appliance server 606A to receive a resource item (e.g., key) that is specific to that secure resource and user combination.

At step 614, the security client 105 interacts with the appliance server 606A to update the resource item (e.g., key) related to the secure resource. For example, the originator of the secure resource, the user device that it is on, the time it was created, etc., may be provided. The security client 105 may also provide permissions to other users, such as User B, to have access to the secure resource. This permission to User B will later allow User B to have access to the secure resource. User B will use another key to access this encrypted asset, previously generated by User A. The key for User B is unique in that it is specific to the combination of User B and the encrypted asset. The permission for user B is also propagated to the appliance server 606A, central server 120, and appliance server 606B.

At step 618, the client 105 provides the permission information for the resource item stored in the appliance server 606A.

At step 620, the appliance server 606A updates/syncs the resource item with the central server 120. At step 622, the central server 120 sends a confirmation to the appliance server 606A. The update/sync step 620 may be performed at predetermined intervals or upon a trigger event. For example, a trigger event may be the creation of a new resource item. At step 622, the central server 120 may provide the key to the appliance server 606A upon request from the appliance server 606A or at predetermined intervals.

The update/sync step may be performed for other appliance servers as well. For example, at step 624 the central server 120 may update/sync the resource item with the appliance server 606B, and it may receive updates/sync messages therefrom (i.e., step 626).

At step 630, the client 106 attempts to store the now encrypted data in a shared storage 604. To that end, the security client 105 performs an operating system 103 call. The secure resource is then stored (i.e., step 632) in the shared storage 604.

At step 640 the calling application 108 of client B may search an asset (e.g., secure resource). This call is intercepted by the security client 109.

At step 642, the security client 109 communicates with the appliance server 606B to request the resource item (e.g., a key).

At step 644, the appliance server sends the resource item to the client 109. In turn, at step 650, the security client 109 performs an operating system call 107 to retrieve the asset (in its secure resource form).

At step 652, the operating system 107 communicates with the shared storage 604 to retrieve the secure resource from organization A.

At step 654, the shared storage 604 sends the encrypted secure resource from organization A to organization B. More precisely, the encrypted secure resource is sent to the operating system 107 of the user device of organization B. In turn, at step 656, the secure resource is sent to the security client 109 and later decrypted (i.e., step 658 by the security client 109).

At step 660, the decrypted asset is provided to the calling application 108 of User B for further processing.

At step 662, the calling application 108 attempts to save the changes made to the secure resource. This operation is intercepted by the security client 109 for encryption (i.e., step 664).

At step 666 the security client 109 communicates with the operating system 107 to save the encrypted data. At step 667, the encrypted data is saved at the shared storage of organization A as a secure resource.

Returning back to step 664, upon encryption of the asset to create a secure resource, in one embodiment, at step 670, the resource item is updated at the appliance server 606B. At step 672, the appliance server 606B communicates with the central server 120 to update/sync the resource item. In turn, at step 674, the central server 120 communicates with the appliance server 606A of organization A to update sync the resource item therewith.

At step 680, the calling application of the user device of organization A may perform a call to delete a secure resource. At step 682, the security client 105 intercepts the call. Further, at step 684 the security client 105 sends a request to the appliance server 606A to retrieve a resource item to perform the deletion.

Next, at step 690, the security client 105 attempts to delete the secure resource from the shared storage 504. To that end, the security client 105 performs an operating system 103 call. In turn, at step 692, the operating system 103 sends a delete command to the shared storage to delete the secure resource from the shared storage 604.

At step 694, a notification is sent to the appliance server 606A that the secure resource has been deleted and that the resource item is therefore no longer needed.

At step 695, the appliance sever 606A performs an update/sync of the status of the resource item with the central server 120. In turn, at step 696, the central server contacts the appliance server 606B to perform an update/sync of the resource item.

Example Intra-Organizational Administration

FIG. 7 illustrates a high level example call flow for intra-organizational administration of data security features. System 700 includes a User A calling application 104, a user operating system 703, a User B calling application 108, and a user operating system 704. System 700 further includes an appliance server 706, a shared storage device 704, and a central server 120. System 700 further includes a client administrator 708 and a system administrator 710.

For example, the client organizational security administrator 708 may be an employee of the organization where users A and B work. The client organizational security administrator 708 may have administrative rights for user client software deployment, updates, patches, and the like.

The central server security system administrator 710, may have authority to grant "client admin administrative control to manage users and to manage the security features of their security clients. For example, the general flow may include the system admin creating a client admin with the rights and privileges to provision system users and their rights and relationships. In FIG. 7, the client admin provisions 2 clients (i.e., User A and User B) who subsequently can perform functions illustrated in FIG. 5. Call flow 700 illustrates that User B is decommissioned (deleted, blocked, etc.) such that they no longer have access to any keys or system rights. User B is now unable to interact with any other part of the system. User A continues to operate as normal and still has access to all data and associated keys relevant to them.

FIG. 7 illustrates two create, read, update, delete (CRUD) taking care of business (TCOB) scenarios 740 and 750. In these two example flows, various create resources, allow access, deny access, delete, and other normal file operations are detailed. It is believed that in view of the discussion of FIGS. 5 to 6 that such operations are self-explanatory and are therefore not elaborated in detail. The two example flows of FIG. 7 are provided to summarize activities illustrated in FIG. 5 that can be performed by authorized users.

Example Record Structure

Figure 8:
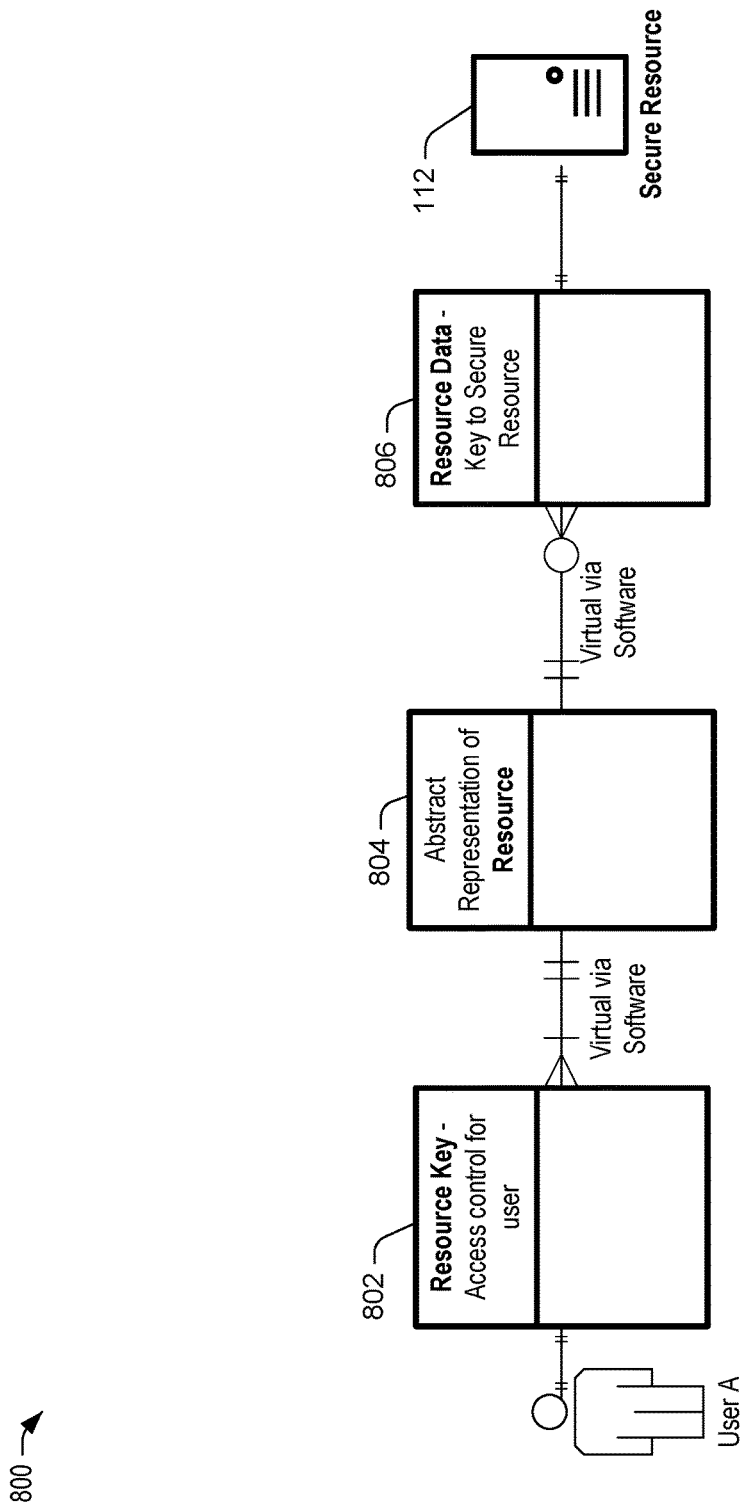
FIG. 8 illustrates an example record structure of the security system.

With the foregoing overview of the security architecture and example call flow processes of FIGS. 4 to 7, it may be helpful to now describe the record structure. To that end, FIG. 8 illustrates an example record structure of the security system discussed herein. For example, FIG. 8 illustrates the virtual association of various modules (e.g., 802, 804, and 806) that may be in the form of tables. These modules are used by the appliance server (and/or the central server) to provide a path between a user (e.g., User A) and a secure resource 112 that may be in ciphertext. Ciphertext is the result of encryption (e.g., using a key) that is performed on plaintext using an algorithm, called a cipher. As used herein, ciphertext is the encrypted data that a user is attempting to interact with (e.g., read, write, update, delete, etc.). In various examples, this ciphertext is described herein as a secure resource 112.

In the example of FIG. 8, User A is abstracted to represent a user device having a calling app 104, a client 105 and an operating system 103, similar to that of FIG. 1. Each resource key 802 is unique in that it is specific to a given user (e.g., User A) and a resource 804 combination. For example, a resource key 802 is created and provisioned by the appliance server 118 (and/or central server 120) when User A has been given access to a specific resource 804. The resource key 802 may also include access control permissions specific to that resource 804 and user (e.g., User A) combination. Such architecture provides for fine grain control of access and permissions.

For example, User A may request access to a secure resource 112. Such request may involve a calling app 104 of the user device 102 of User A to perform an operating system call. This request is intercepted by the client 105 of the user device 102, represented by User A in FIG. 8.

In turn, the client 105 of the user device sends a message (e.g., request) to the appliance server 118 (or the central server 120) to receive access to the secure resource 112. Upon determining that the User A is authorized to have access to the secure resource 112, the appliance server 118 (or the central server 120) sends a first encrypted message having a resource key 802 to User A. This first encrypted message can be decrypted by a private key of User A.

Upon decrypting the first encrypted message using the private key, User A (i.e., the client 105 of the user device 102) sends a message (e.g., request) to the appliance server 118 (or central server 120) for the resource 804 information, sometimes referred to herein as the resource item. The resource 804 is a single representation for all existing versions of a specific secure resource 112 or other specific object that is access controlled by the security system described herein, through the key provided by the resource data 806.

Upon determining that User A (i.e., the client 105 of the user device 102) has decrypted the first encrypted message, as indicated by the request for the resource 804, the appliance server 118 (or central server 120) sends a second encrypted message having the resource item 804 to User A. The second encrypted message can be decrypted by the resource key of the first decrypted message.

Upon decrypting the second encrypted message using the resource key 802, User A (i.e., the client 105 of the user device 102) sends a message (e.g., request) to the appliance server 118 (or central server 120) for the resource data 806 information. The resource data 806 includes a key for User A to access a predetermined version of the secure resource 112. In one embodiment, the resource data 806 also includes a stored at rest location information of the secure resource 112.

Upon determining that User A (i.e., the client 105 of the user device 102) has decrypted the second message, as indicated by the request for the resource data, the appliance server 118 (or central server 120) sends a third encrypted message having the resource data 806. The third encrypted message can be decrypted by the resource item of the second decrypted message, wherein the resource data 806 is configured to decrypt the secure resource 112.

The secure resource 112 may have several versions, which in their simplest form, are historical copies of the secure resource 112, which are saved via a user-manageable process. Accordingly, a custom record of the progress of the secure resource 112 may be provided. In some embodiments, such version control provides the infrastructure for rollback, data recovery (DR), and other temporal control functions.

Relationally, a resource 804 has at least one resource key 802 associated with it. The resource key 802 provides a record for the owner (e.g., User A or another user) of the resource 804. That owner can create (or destroy) additional resource keys 802 for other users in order to control access to the resource 804. In one embodiment, there is no limit to the number of resource keys that can be associated with a given resource 804.

In one embodiment, a resource 804 need not have an associated 806 record, because there may only be a single version of the secure resource. However, a resource 804 may have as many resource data 806 records as there are versions of the resource data to accommodate different versions of the secure resource 112. In one example, if there is no associated resource data 806 record, the resource record 804 may refer to objects outside of the scope of the security system 800 or other abstractions that do not require the resource data 806 record.

The resource data 806 represents a single record associated with a single instance of a secure resource 112. For example, the resource data 806 includes relevant metadata for that particular version of the secure resource 112. Relationally, a resource data 806 has only one secure resource 112 related to it. Put differently, the resource data 806 provides a key to a particular version of the secure resource 112. The secure resource, represented by block 112, is the encrypted version of the object that the user (e.g., User A) wishes to interact with (e.g., perform a read, write, update, delete, etc.). The resource key 802, resource 804, and resource data 806 may be stored in a memory of the appliance server 118 and/or the central server 120.

Figure 9:
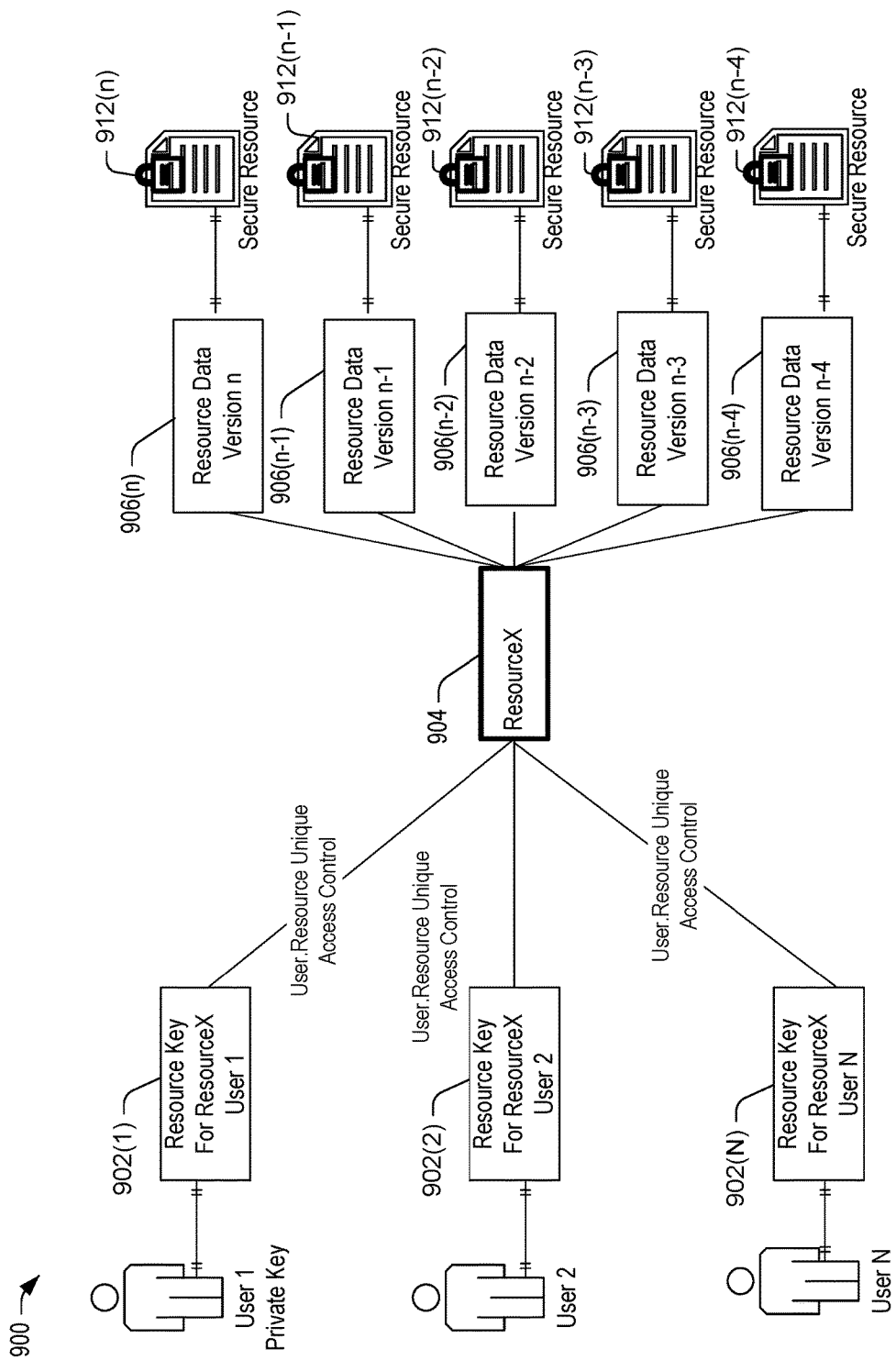
FIG. 9 illustrates multiple users accessing the same resource that has multiple versions of the related secure resource, consistent with an exemplary embodiment.

Reference now is made to FIG. 9, which illustrates multiple users accessing the same resource 904 that has multiple versions of the related secure resource, consistent with an exemplary embodiment. By way of example, FIG. 9 illustrates five different versions of a resource 904, while it will be understood that other number versions of the secure resource are supported as well.

Each of the users (e.g., user 1 to user N) has a single unique resource key (i.e., 902(1) to 902(N), respectively), to address the resource, represented by the ResourceX block 904. The different resource data versions are depicted by way of example to be sequential from "n" to "n−4." It will be understood that other version numbering systems may be used as well. For example, various versioning methods may be used to retain all versions, rolling last entries, original, latest, etc.

Figure 10:
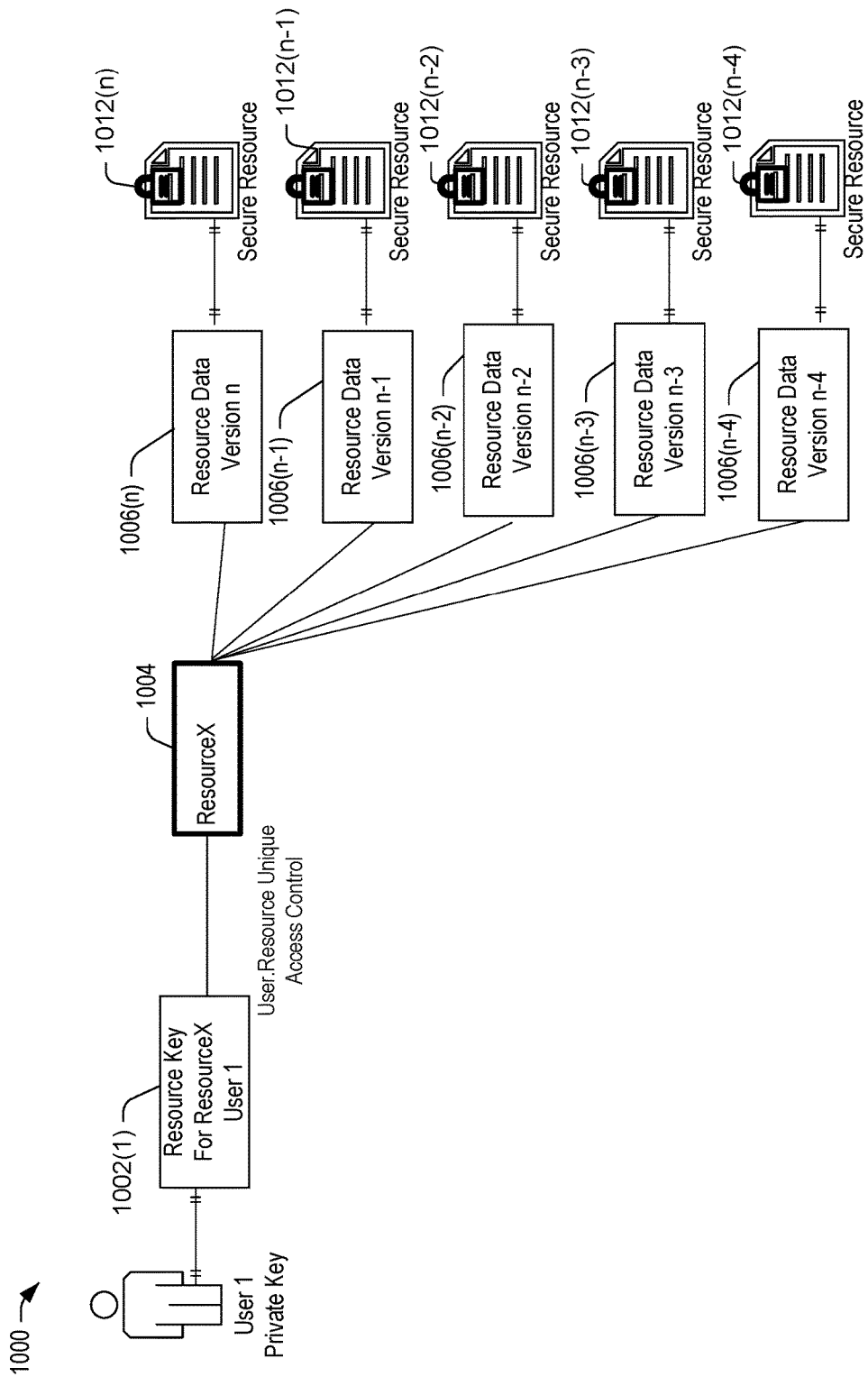
FIG. 10 illustrates a single user accessing a resource that has multiple versions of the related secure resource, consistent with an exemplary embodiment.

FIG. 10 illustrates a single user (i.e., user 1) accessing the same resource 1004 that has multiple versions of the related secure resource (1012(n) to 1012(n−4), consistent with an exemplary embodiment. The concepts depicted in FIG. 10 are similar to those of FIG. 9 and are therefore not repeated here for brevity.

In FIG. 10, a single user can access one or more versions of the secure resource, depending on the access granted to the user. In one embodiment, a user having access to the resource 1004, automatically has access to the latest version of the resource 1004. Put differently, the resource 1004 automatically points to the resource data having the latest version (e.g., n).

Referring back to FIG. 9, in one embodiment, the tables and records discussed herein, represented by resource keys 902(1) to 902(n), resource 904, and resource data 906(n) to 906(n−4), reside on the appliance server(s) 118 and/or 124 (and by extension the central server 120, illustrated in FIG. 1) when at rest. In one embodiment, all linkages between these tables are controlled via a program for improved control and security.

Example Transport Envelope

Figure 11:
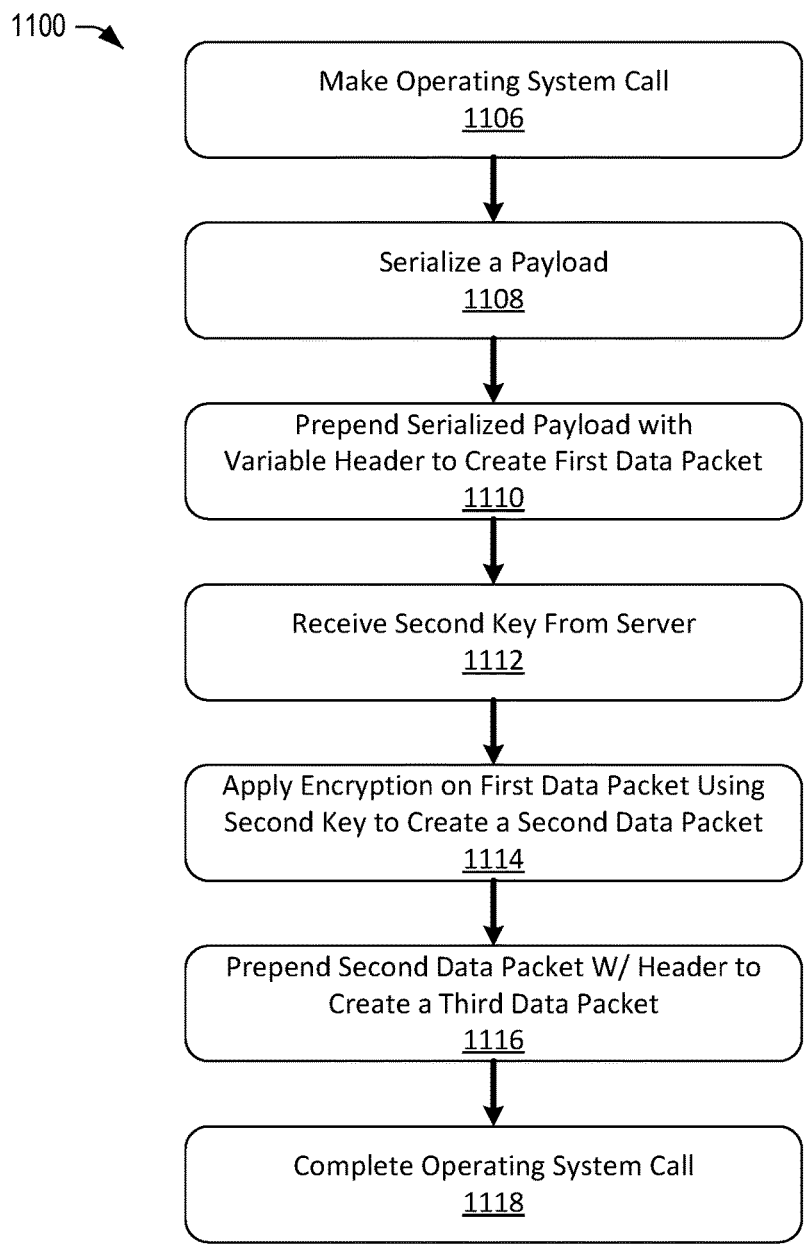
FIG. 11 illustrates a high level example process flow for a data transport using a transport envelope in the context of the security system of FIG. 1.
Figure 12:
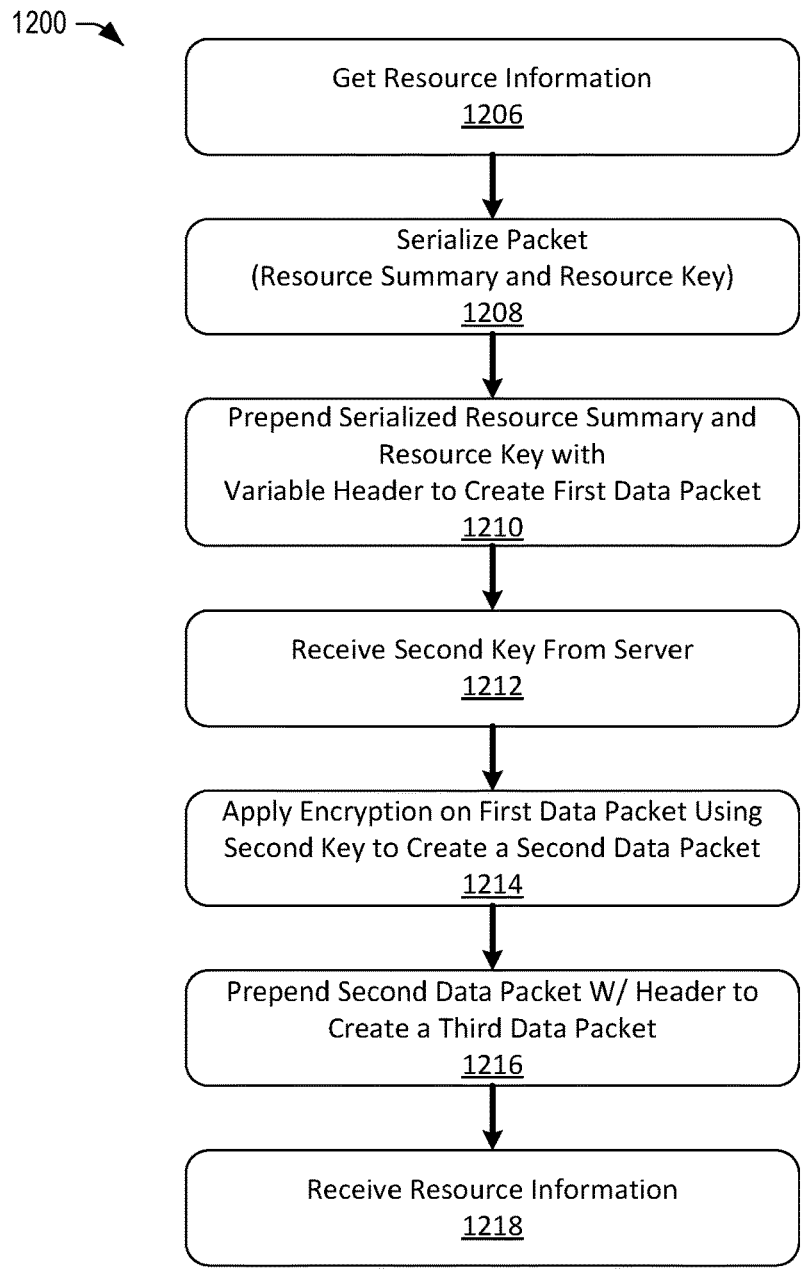
FIG. 12 illustrates a high level example process flow for a data transport using a transport envelope in the context of a request to get resource information.
Figure 13:
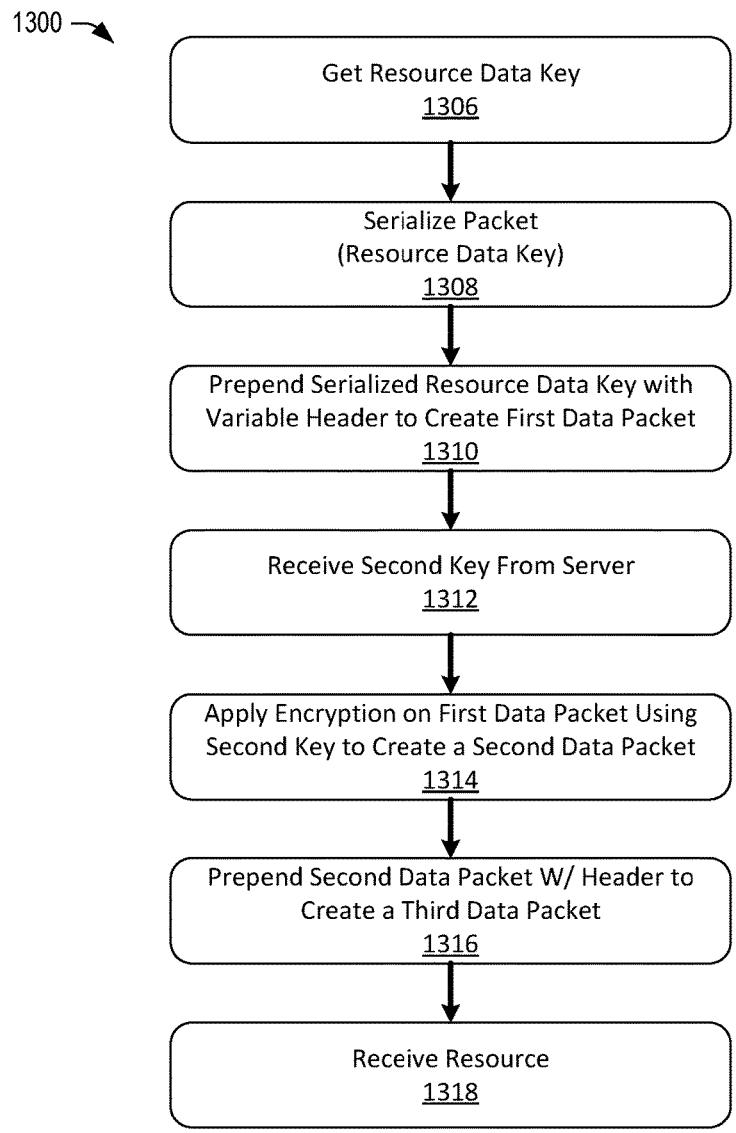
FIG. 13 illustrates a high level example process flow for a data transport using a transport envelope in the context of a request to get a resource.

FIGS. 11 to 13 illustrate a high level example process flow for a data transport using a transport envelope in the context of the security system of FIG. 1. The processes 1100 to 1300 are illustrated as a collection of steps in logical flows, which represent a sequence of operations that can be implemented in hardware, software, or a combination thereof. For discussion purposes, the processes 1100 to 1300 are described with reference to system 100 of FIG. 1.

Process flow 1100 involves a user device that includes a calling application 104, a security client 105, and an operating system 103. The user device is attempting to interact with an asset (e.g., a spreadsheet document, word document, mp3 file, etc.), by performing an operation (e.g., read, write, update, delete, etc.). To that end, the user device may communicate with an appliance server 118 and/or a central server 120. The interaction with the appliance server 118 and/or the central server 120 may be transparent to the operator of the user device. In the example of FIG. 11, the communication between the user device and the appliance server 118 and/or the central server 120 is via this transport envelope. The transport envelope is prepared by the client 105 of a user device (e.g., 102).

At block 1106 an operating system call is performed on the user device. For example, an asset (e.g., document) may be attempted to be retrieved to be edited or sent to another user device.

At block 1108, the payload is serialized. In one embodiment, the payload is any of the keys and records, previously described, that are sent between clients and servers (appliance and central). Serialization of the payload may be performed by various pre-defined methods, such as Java Script Object Notation (JSON).

At block 1110, the serialized payload is prepended with a variable header to create a first data packet. In one embodiment, the header is of variable length and unrelated to the payload. By virtue of using a header of variable length, the length of the message is obscured, such that two subsequent messages that may have the same payload, will not have the same signature. Thus, the first data packet is typically unique.

At block 1112, a second key is received from the appliance server 118 (and/or the central server 120). The second key is based on the appliance server 118 (and/or central server 120) symmetric public key.

At block 1114, the first data packet (comprising the variable header and the serialized payload) is further encrypted using the second key from the appliance server 118 (and/or by extension the central server 120) to create a second data packet.

At block 1116, the second data packet (comprising the encrypted variable header and serialized payload) is prepended with a second header to create a third data packet. In one embodiment, the second header is a keyed-hash message authentication code (HMAC). Such construction of the header provides for the calculation of a message authentication code (MAC) that may be used to simultaneously verify the data integrity and the authentication of the message. Thus, HMAC and ciphertext may be used to confirm that there were no changes in transit.

At block 1118, the operating system call is completed. For example, the third data packet is sent to its destination using the secure transport scheme. In various embodiments, Transport Layer Security (TLS) or Secure Sockets Layer (SSL), which are protocols that provide privacy between communicating applications and their users on the Internet, may be used. Of course, other appropriate secure transport protocols may be used as well.

FIG. 12 illustrates a high level example process flow for a data transport using a transport envelope in the context of a request to get resource information.

At block 1206 an operating system call is performed on the user device that involves a request to get resource information (e.g., similar to block 802 of FIG. 8). The operating system call is related to a resource summary and encrypted resource key. In one embodiment, the resource key is encrypted based on a private key of the user device originating the get resource request.

At block 1208, the data packet (comprising the resource summary and encrypted resource key) is serialized.

At block 1210, the serialized data packet is prepended with a variable header to create a first data packet. In one embodiment, the header is of variable length and unrelated to the payload.

At block 1212, a second key is received from the appliance server 118 (and/or the central server 120). The second key is based on the symmetric public key from the appliance server 118 (and/or central server 120). In one embodiment, the second key is substantially similar to the resource item 804 described in the context of FIG. 8. In this embodiment, the resource item provides a single representation for all existing versions of a specific secure resource 112 or other specific object that is access controlled by the security system described herein.

At block 1214, the first data packet (comprising the variable header and the serialized payload) is further encrypted using the second key from the appliance server 118 (and/or by extension the central server 120) to create a second data packet.

At block 1216, the second data packet (comprising the encrypted variable header and serialized payload) is prepended with a second header to create a third data packet. In one embodiment, the second header is based on a keyed-hash message authentication code (HMAC) protocol.

At block 1218, the resource information is received by the user device.

Reference now is made to FIG. 13, which illustrates a high level example process flow for a data transport using a transport envelope in the context of a request to get a resource.

At block 1306 an operating system call is performed on the user device that involves a request to get a resource data key. In one embodiment, the request may be encrypted using the key delivered by the appliance server 118 and/or the central server 120. In one embodiment, the resource data key provides access for a user to a predetermined version of the secure resource 112. The resource data key has been encrypted by the resource key and is delivered to the user device in that state. The user device had received the resource key in the prior exchange and will use the resource key to decrypt the resource data key, as described below.

At block 1308, the encrypted resource data key is serialized. In one embodiment, an associated resource key which is used to decrypt the resource data key was provided in the response to the "get resource request" of flow 1200.

At block 1310, the serialized data packet is prepended with a variable header to create a first data packet. In one embodiment, the header is of variable length and unrelated to the payload.

At block 1312, a second key is received from the appliance server 118 (and/or the central server 120). The second key is based on the appliance server 118 (and/or central server 120) symmetric public key.

At block 1314, the first data packet (comprising the variable header and the serialized data packet) is further encrypted using the second key from the appliance server 118 (and/or by extension the central server 120) to create a second data packet.

At block 1316, the second data packet (comprising the encrypted variable header and serialized payload) is prepended with a second header to create a third data packet. In one embodiment, the second header is a keyed-hash message authentication code (HMAC).

At block 1318, the resource is received by the user device.

Figure 14:
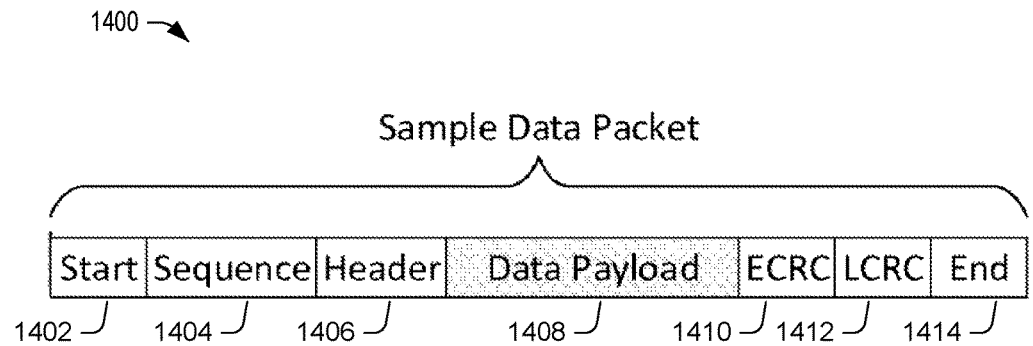
FIG. 14 illustrates a conventional transport envelope.
Figure 15:
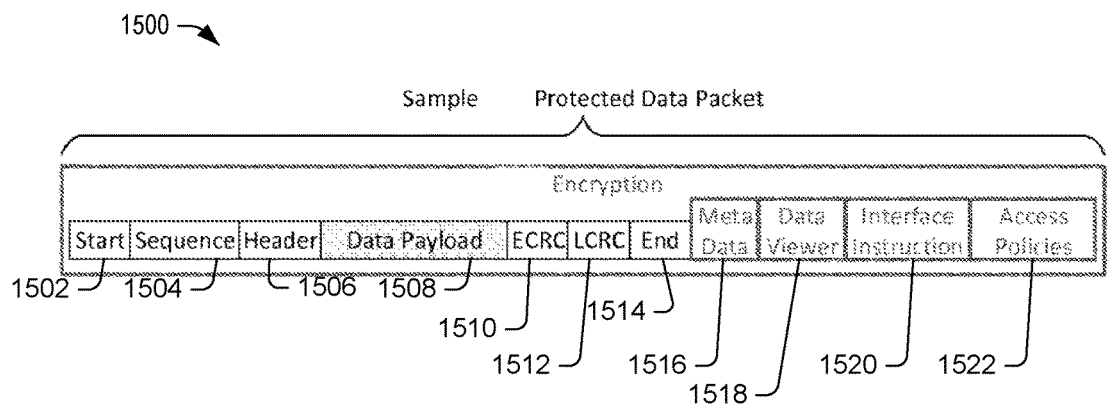
FIG. 15 illustrates a transport envelope, consistent with an exemplary embodiment.

It will be understood that the architecture of the transport envelope described in the context of FIGS. 11 to 13 are based exemplary embodiments. Accordingly, other embodiments are supported as well. To that end, FIG. 15 illustrates an alternate transport envelope, consistent with another exemplary embodiment. FIG. 15 stands in contrast to the prior art of FIG. 14 that includes the following fields: a start character (character or series of characters) 1402, a sequence 1404, a header 1406, a data payload 1408, an end cyclic redundancy check (ECRC) 1410, a local cyclic redundancy check (LCRC) 1412, an end (character or series of characters) 1414.

In contrast to the shell of the prior art 1400, the transport envelope 1500 may include the following additional fields: metadata 1516, a data viewer 1518, interface instruction 1520, and access policies 1522. By virtue of the transport envelope 1500, corporate policies, access restrictions, time limits, and/or data viewers can be embedded within the data packet itself, which is protected by encryption. For example, the metadata 1516 may include additional information related to the asset to be protected. Further, there may be a reference to an appropriate application (e.g., codec) to open/use the asset, represented by the data viewer field 1518. In one embodiment, the data viewer field 1518 may include the actual codec to open and/or use the asset. For example the actual codec may be included when it is unique and/or small enough to fit in the data viewer field.

Accordingly, the disclosed technologies can provide a stand-alone secured solution which can be utilized even when the user only has access to the data and a connection to the referenced server. As such, backup tapes (such as those that are stored for decades) can remain protected and accessible to the users and to the corporate hierarchical key.

Hardware Independence

In some embodiments, the disclosed technologies can be implemented such that they can operate independent of a hardware layer, a network layer, and/or an application layer. Moreover, the disclosed technologies can be implemented within a single domain, network, and/or device, as well as across disparate domains and networks. Additionally, in certain implementations a hardware interface can also be employed, thereby enabling the described technologies to be implemented in scenarios not requiring a separate device (e.g., a computer, tablet or smartphone). For example, such a device can enable data to be streamed while encrypted, decrypted for use, and then deleted. In doing so, at no point does the file itself exist in an unencrypted format (thereby preventing possible theft of the unencrypted data).

In some embodiments, data that is managed by the described technologies can be encrypted at all times (except when in use). For example, such data can be encrypted while stored on an end-user device, while in-transit and/or while stored (e.g. on a server or SAN). It should be understood that such data can be encrypted at all times except (sometimes) when in use. In certain implementations the referenced data can be encrypted using various encryption techniques, such as a combination of AES 256, AES 1024, PKI, etc., as well as various proprietary encryption techniques. Moreover, various data viewers can be provided, which can be configured to prevent the application and device OS from being able to read the data even when the file is in use (e.g., decrypted).

Biometric Security

In some embodiments, various biometric techniques/technologies (e.g., fingerprint scan, retina scan, etc.) may be used in order to authenticate the user. Additionally, the disclosed technologies can utilize proprietary firmware with respect to an application-specific integrated circuit (ASIC) that can be implemented in conjunction with the biometric device (e.g., a fingerprint scanner). By utilizing the referenced proprietary firmware it can be appreciated that the biometric device can be manufactured by a third party without compromising data security. Additionally, in certain implementations the biometric scanner can be configured/programmed at the time of user registration via a universal serial bus (USB) connection. Moreover, an encryption/decryption code can be embedded into the biometric unit, thereby offloading the encryption/decryption overhead from the device making use of the data. It should be understood that the referenced biometric unit can be used to decrypt data even without a dedicated computing device (e.g., in order to enable peripheral devices such as printers, copiers, digital projectors etc. to access the encrypted data). Moreover, in certain implementations the biometric unit can be software serialized and can be registered to the specific user, thereby providing another layer of identity verification.

Figure 16:
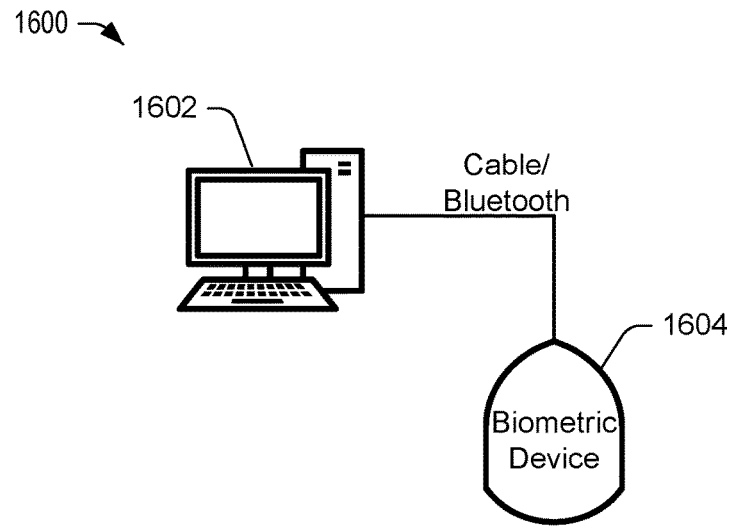
FIG. 16 illustrates an exemplary scenario in which a biometric device is utilized to authenticate a on a user device.

FIG. 16 illustrates an exemplary scenario in which a biometric device 1604 is utilized to authenticate a user (and thereby decrypt encrypted data) on a user device 1602. In certain implementations, the first time the biometric device 1604 is connected to the user device 1602, a client agent software may inject firmware into the biometric device 1604. In doing so, the biometric becomes specific to the described encryption system. The biometric can also be serialized and assigned (bonded), e.g., exclusively, to a single user. The encryption/decryption engine can also be implemented on the biometric, thereby eliminating any computational overhead on the computer. Additionally, RAM on the biometric device 1604 can be encrypted and can be used as an encrypted storage accessible by the assigned user (e.g., exclusively).

Figure 17:
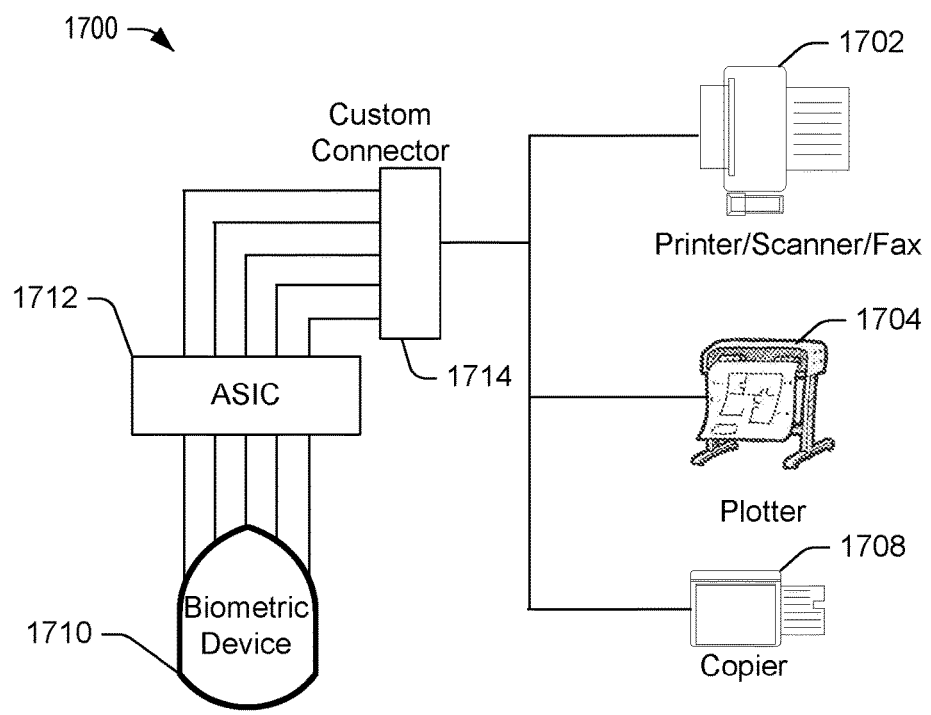
FIG. 17 illustrates an exemplary scenario in which a referenced application specific integrated circuit (ASIC) is used in connecting the biometric device to various device.

FIG. 17 illustrates an exemplary scenario in which a referenced application specific integrated circuit (ASIC) 1712 can be used in connecting the biometric device 1710 to various device(s) 1702 to 1708. In various scenarios, these devices 1702 to 1708 can be used to receive/output streaming data that is encrypted (e.g. printers, copiers, etc.) A security system provider can also secure and stream data to non-PC related devices. Further, other devices that can send and/or receive data through a connector/interface (wired or wireless) can receive, utilize, and/or output encrypted data, which can be decrypted using the referenced biometric device together with the appliance server and/or the central server.

Audit Trail

In some embodiments, each instance of a login, user access, file access, etc., can be tracked and recorded. Such an audit trail can include date and timestamps, copies, moves, creation of user keys, etc. This audit source can also be encrypted and can be configured to be displayable in read only mode. In doing so, no changes/tampering can be made to the audit log, whether by the client or another source.

Example Implementations

The disclosed technologies can be implemented as an internet based service, a network-based product, and/or both. In certain implementations it may be advantageous to allow a user's public keys to be shared with the various internet based servers such that, for example, various technologies such as secured email/communications can be sent to recipients that are not part of the client's network.

As described herein, each document that is secured via the described technologies can be protected/encrypted by a unique set of keys. For example, each shared document (e.g., in a file management system) can contain, incorporate, and/or otherwise be associated with respective keys that correspond to the respective parties having permission to access it. As permissions are defined for a particular file, e.g., adding or removing new editors/collaborators, etc., new keys can be added or removed with respect to the document. Accordingly, being that each file is encrypted with a unique key, any potential hacking of any one key gains the hacker no benefit as each subsequent file would still need to be hacked from scratch.

Search Engine

In one embodiment, since each file secured by the disclosed technologies is encrypted, conventional search tools are not likely to be effective as such technologies are unable to read encrypted files. In addition, a search index created by a conventional search engine becomes another file that can be easily stolen and/or misused by a hacker. Additionally, in many scenarios a user with low network access rights can still manage to download and run a search engine which is able to pick up data that is left open due to poor user access schemes. In contrast, the disclosed technologies address the referenced shortcomings/issues by providing a search engine that can scan through encrypted data. In doing so, the search engine is only capable of scanning data that the user has appropriate access to, and any retrieved search results can be encrypted to ensure that that they can't be misappropriated or misused.

Additionally, as described herein, in certain implementations, access policies can be encapsulated within a data packet itself. Doing so ensures that, regardless of the platform or viewer used to access the data, only the users having access to the data can actually see the data. Accordingly, implementing the described technologies (in which each file is encrypted with unique keys) precludes the occurrence of hacking incidents in which large amounts of data can be stolen (with the hackers then having the luxury of scanning through it, indexing it, examining it, etc. at their leisure). By encrypting each file, etc., separately, the disclosed technologies ensure that such attacks are no longer possible.

Key Management

As noted, because, in various implementations the referenced keys can be managed (e.g., by the described technologies) at a user level and/or at a file level, access to such data can always be controlled/secured based on a file or based on a user. For example, user "Bob" can have access revoked to all of his files, or all of the files associated with to a certain project (e.g., by revoking the keys associated with the particular user/project). By way of further example, an external contractor or vendor can have access to a clients' files revoked, even, for example, in a scenario in which such files reside on the contractor's or vendor's network and/or device. This can be accomplished because the referenced files are (and remain) encrypted, and can be decrypted via keys which are stored at a central server. Thus, upon revoking such key(s) at the appliance and/or central server, the contractor, etc., will be precluded from decrypting the referenced files (despite still having possession of them in their encrypted form). Similarly, files associated with a particular project can be retired (e.g., upon completion) by revoking the keys that have been used to decrypt such files.

In some embodiments, various file assigned access rights can be embedded within or otherwise associated with data packet(s) or items that are secured using the described technologies. In doing so, policies that pertain to particular files and/or file types can be enforced/upheld in a manner that cannot be circumvented regardless of where the data exists. For example, a policy dictating that email is to be deleted after it is read (or cannot be forwarded, etc.) can be implemented via such embedded access rights/policies. It should be understood that such policies/restrictions can be configured/added (e.g., at the discretion of a user/administrator). For example, a user may be able to define an access restriction that is stronger (but not weaker than) a previously defined access restriction.

Asset Viewer

Moreover, in some embodiments, the disclosed technologies enable the embedding of a viewer and/or access instructions, policies, etc., around various files (and then encrypts such a data file). Such a framework ensures that such instructions/policies and/or viewers are to remain with the data while remaining completely encrypted (and thus indecipherable) to an unauthorized user. In doing so, the referenced encrypted file can remain accessible, even in the future when such a viewer, etc., may no longer be available/accessible.

Secure Data Sharing

It can be appreciated that, using conventional technology, when data was shared in the normal course of business, once that data left the confines of a user device (e.g., by sending an email) there was no way to ensure that the data was properly secured, tracked or even destroyed (if necessary). However, such functionality can be achieved by the technologies described herein. For example, if a company's data is stored offsite (e.g., for collaborative purposes), the company can still maintains full access and rights to secure, track and even delete that data. The user housing the data is unable to prevent the data owner from retaining control of their data. Conversely, if the data is intentionally shared, not only may the recipient have access to the shared data (e.g., indefinitely), but the recipient may also have all of the aforementioned abilities with that data as a new owner or co-owner.

In some embodiments, the disclosed technologies can secure data at the data level (e.g., as opposed to and/or in addition to securing data at the operating system or application level). In doing so the secured data can be freely moved, shared, etc., such as over the internet, from one type of device to another (e.g. corporate WINDOWS (Registered trademark) network to IPHONE (Registered trademark)) while still retaining the security and security policies established by the data owner/originator with respect to the transferred data. Additionally, as noted, the described technologies can be implemented with respect to a network, existing cloud providers, and/or any combination thereof.

Encrypted data can be stored on any network/domain (e.g., cloud or partner based), and the data can remain as secure and accessible as if it was within a single network. For example, an encrypted private network can be implemented over public internet infrastructure. In doing so, users receive the benefit of low cost and readily available internet infrastructure with the high level security, enabled by the disclosed technologies.

In some embodiments, the various servers can be configured as a node network. In doing so, the various servers can communicate with each other, and, for example, share the public side of access keys. In doing so, multiple levels of redundancy can be employed. Moreover, the referenced servers can be configured to host public and/or private keys. Accordingly, even if a segment of the referenced network is disabled (e.g. in the event of a disaster, loss of connectivity, etc.), the disclosed technologies can enable access to the encrypted data/files, as long their user device remains functional. Additionally, in certain implementations, users that are not subscribed with respect to the disclosed technologies can still receive protected email, data, etc., that is secured using the disclosed technologies. For example, in an email scenario, unsubscribed users can respond to a secured email, and all data can remain secured.

Implementation by Using Existing Network Equipment

It can be appreciated that that the disclosed technologies can be implemented/integrated with existing technology without necessitating changes in existing equipment, code, frameworks, etc. Additionally, the disclosed technologies can provide complete control and security for data, whether sent by email, file transfer or used on cloud collaboration. Both email and the files retain fully revocable access rights across any network including public email systems.

Example Computer Platform

Figure 18:
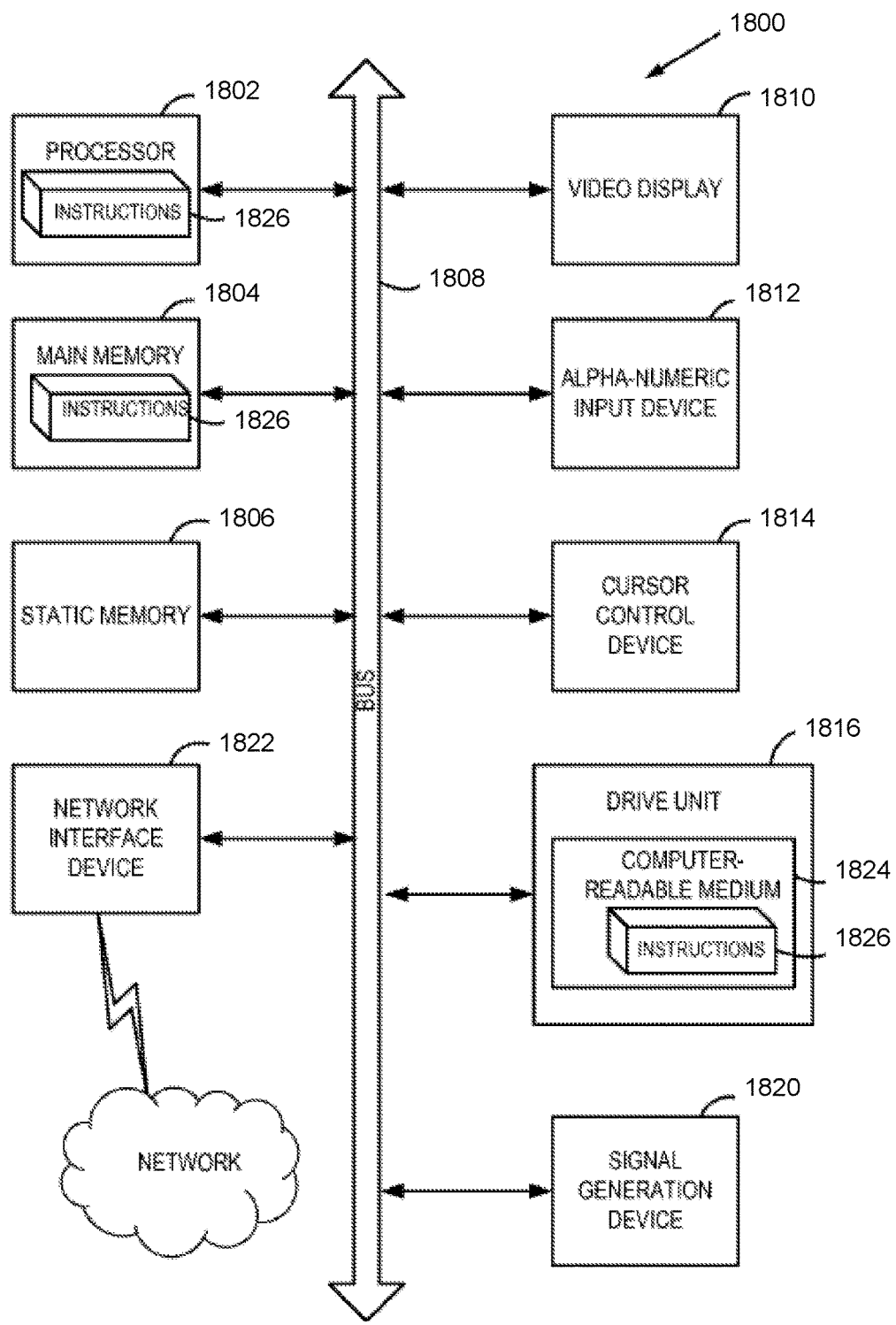
FIG. 18 provides a functional block diagram illustration of a general purpose computer hardware platform that may be used to implement various computing devices of FIG. 1.

As discussed above, functions relating to providing pervasive data security can be performed on one or more computing devices connected for data communication, as shown in FIG. 1. FIG. 18 provides a functional block diagram illustration of a general purpose computer hardware platform. In particular, FIG. 18 illustrates example computer system within which a set of instructions, for causing the machine to perform any one or more of the methodologies discussed herein. In alternative implementations, the machine may be connected (e.g., networked) to other machines in a LAN, an intranet, an extranet, or the Internet.

The machine may operate in the capacity of a server machine in client-server network environment. The machine may be a computing device integrated within and/or in communication with a vehicle, a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1800 includes a processing system (processor) 1802, a main memory 1804 (e.g., read-only memory (ROM), flash memory, dynamic random access memory (DRAM) such as synchronous DRAM (SDRAM)), a static memory 1806 (e.g., flash memory, static random access memory (SRAM)), and a data storage device 1816, which communicate with each other via a bus 1808.

Processor 1802 represents one or more general-purpose processing devices such as a microprocessor, central processing unit, or the like. More particularly, the processor 1802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1802 may also be one or more special-purpose processing devices such as an application specific integrated circuit (ASIC), a field programmable gate array (FPGA), a digital signal processor (DSP), network processor, or the like. The processor 1802 is configured to execute instructions 1826 for performing the operations and steps discussed herein.

The computer system 1800 may further include a network interface device 1822. The computer system 1800 also may include a video display unit 1810 (e.g., a liquid crystal display (LCD) or a cathode ray tube (CRT)), an alphanumeric input device 1812 (e.g., a keyboard), a cursor control device 1814 (e.g., a mouse), and a signal generation device 1820 (e.g., a speaker).

The data storage device 1816 may include a computer-readable medium 1824 on which is stored one or more sets of instructions 1826 (e.g., instructions executed by server machine 120, etc.) embodying any one or more of the methodologies or functions described herein. Instructions 1826 may also reside, completely or at least partially, within the main memory 1804 and/or within the processor 1802 during execution thereof by the computer system 1800, the main memory 1804 and the processor 1802 also constituting computer-readable media. Instructions 1826 may further be transmitted or received over a network via the network interface device 1822.

While the computer-readable storage medium 1824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

CONCLUSION

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

It is understood that any specific order or hierarchy of steps in the flow processes disclosed in FIGS. 4 to 7 are illustrations of exemplary approaches. Based upon design preferences, it is understood that the specific order or hierarchy of steps in the processes may be rearranged, expanded, and some steps omitted. Some of the blocks may be performed simultaneously.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A computing device comprising:
   a processor;
   at least one network interface coupled to the processor configured to enable communications via one or more communication networks;
   a memory for content and programming;
   a security client program stored in the memory, wherein execution of the security client program by the processor configures the computing device to perform acts comprising:
   intercepting an operating system call performed by a calling application to create a particular version of a plurality of versions of an unencrypted asset;
   requesting a first key for the unencrypted asset from a server, the first key corresponding to a user identity associated with the computing device and the particular version of the unencrypted asset;

upon receiving the first key for the particular version of the unencrypted asset from the server:
creating a secure resource by encrypting the unencrypted asset;
completing the operating system call;
sending an update message to the server, the update message including an indication to provide a second user identity with permission to access only the particular version of the unencrypted asset; and
upon failing to receive the first key in response to requesting the first key, suspending the operating system until receipt of the first key.

2. The computing device of claim 1, wherein the operating system call includes an instruction to at least one of: (i) edit, (ii) send, and (iii) store encrypted asset.

3. The computing device of claim 1, further comprising a shared storage that is shared between several users.

4. The computing device of claim 1, wherein intercepting the operating system call is performed with an intervening hook, the intervening hook being a web distributed authoring and versioning (WebDav) protocol.

5. The computing device of claim 1, wherein the update message includes a storage at rest location information of the secure resource.

6. The computing device of claim 1, wherein the update message includes an additional indication to provide a plurality of users with access to the secure resource.

7. The computing device of claim 1, further comprising:
intercepting, by the security client program, an operating system call performed by the calling application to retrieve, a particular version of a secure resource;
receiving, from an appliance server, a digital key that corresponds to the user identity and the particular version of the secure resource;
performing a second operating system call to search a shared storage for the particular version of the secure resource;
receiving, from the shared storage, an encrypted asset that includes the particular version of the secure resource; and
decrypting, via the digital key, the encrypted asset to access the particular version of the secure resource.

8. The computing device of claim 7, wherein the computing device is associated with a first organization, and the particular version of the secure resource is associated with a second organization that is different from the first organization, and wherein the shared storage is associated with the first organization and the second organization.

9. An appliance server, comprising:
a processor;
at least one network interface coupled to the processor configured to enable communications via one or more communication networks;
a memory for content and programming;
a program stored in the memory, wherein execution of the program by the processor configures the appliance server to perform acts, comprising:
receiving a request for access to a particular version of a plurality of versions of a secure resource during an intercepted operating system call on a first user device;
upon determining that the first user device is authorized to have access to the secure resource, sending a first encrypted message having a resource key to the first user device, such that the first encrypted message can be decrypted by a private key of the first user device;
upon determining that the first user device has decrypted the first encrypted message to access the resource key, sending a second encrypted message having a resource item, such that the second encrypted message can be decrypted by the resource key;
upon determining that the first user device has decrypted the second encrypted message to access the resource item, sending a third encrypted message having a resource data, such that the third encrypted message can be decrypted by the resource item, wherein the resource data is configured to decrypt the particular version of the secure resource; and
upon determining that the first user device has failed to decrypt the first encrypted message to access the resource key, suspending the operating system until determining that the first user device has access to the resource key.

10. The appliance server of claim 9, wherein the resource item is a single representation of the plurality of versions of the secure resource.

11. The appliance server of claim 9, wherein the resource data is configured to provide a stored at rest location information of the secure resource.

12. The appliance server of claim 9, further comprising a separate resource data stored in the memory of the appliance server for every version of the secure resource.

13. The appliance server of claim 9, wherein the secure resource is stored at a remote server.

14. The appliance server of claim 9, wherein the resource key, the resource item, and the resource data are stored in the memory of the appliance server.

15. The appliance server of claim 9, further comprising:
performing a biometric analysis to authenticate a user identity associated with the first user device, the biometric analysis corresponding to at least one of a fingerprint scan, or a retina scan, and
wherein, the determining that the first user device is authorized to access the secure resource is based at least in part on the biometric analysis.

16. The appliance server of claim 9, further comprising:
receiving, from the first user device, resource information that indicates that a second user device is authorized to access a specific version of the secure resource; and
generating an additional resource key that corresponds to a user identity associated with the second user device and the specific version of the secure resource.

17. The appliance server of claim 16, wherein the first user device is associated with a first organization and the second user device is associated with a second organization, the first organization being different from the first organization, and further comprising:
propagating the additional resource key to at least a central server associated with the first organization and the second organization.

18. The appliance server of claim 17, wherein, in response to propagating the additional resource key to the central server, further comprising:
causing the central server to further update an additional appliance server associated with the second organization.

19. A computing device comprising:
a processor;
at least one network interface coupled to the processor configured to enable communications via one or more communication networks;
a memory for content and programming;

a security client program stored in the memory, wherein execution of the security client program by the processor configures the computing device to perform acts comprising:

intercepting an operating system call performed by a calling application to create a particular version of a plurality of versions of an unencrypted asset;

requesting a first key for the unencrypted asset from a server, the first key corresponding to a user identity associated with the computing device and the particular version of the unencrypted asset;

upon receiving the first key for the particular version of the unencrypted asset from the server:
  creating a secure resource by encrypting the unencrypted asset;
  completing the operating system call;
  sending an update message to the server, the update message including an indication to provide a second user identity with permission to access only the particular version of the unencrypted asset; and upon failing to receive the first key in response to requesting the first key, encrypting the unencrypted asset using a local key and suspending the operating system until receipt of the first key.

20. The computing device of claim 19, wherein the operating system call includes an instruction to at least one of: (i) edit, (ii) send, and (iii) store encrypted asset.

* * * * *